US011403100B2

(12) United States Patent
Mihocka et al.

(10) Patent No.: US 11,403,100 B2
(45) Date of Patent: Aug. 2, 2022

(54) DUAL ARCHITECTURE FUNCTION POINTERS HAVING CONSISTENT REFERENCE ADDRESSES

(71) Applicant: Microsoft Technology Licensing, LLC, Redmond, WA (US)

(72) Inventors: Darek Josip Mihocka, Mercer Island, WA (US); Clarence Siu Yeen Dang, Newcastle, WA (US); Pedro Miguel Sequeira De Justo Teixeira, Kirkland, WA (US); Pavlo Lebedynskiy, Sammamish, WA (US); James David Cleary, Seattle, WA (US); Jon Robert Berry, Woodinville, WA (US); YongKang Zhu, Redmond, WA (US); Tiansheng Tan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/008,163

(22) Filed: Aug. 31, 2020

(65) Prior Publication Data

US 2022/0066780 A1    Mar. 3, 2022

(51) Int. Cl.
*G06F 9/30* (2018.01)
*G06F 9/455* (2018.01)

(52) U.S. Cl.
CPC .......... *G06F 9/30174* (2013.01); *G06F 9/455* (2013.01); *G06F 9/4552* (2013.01); *G06F 9/45516* (2013.01)

(58) Field of Classification Search
CPC ............... G06F 9/30174; G06F 9/4552; G06F 9/45516; G06F 9/455; G06F 9/35
See application file for complete search history.

(56) References Cited

U.S. PATENT DOCUMENTS 4,969,204 A    11/1990 Jones et al.
5,050,230 A    9/1991 Jones et al.
(Continued)

FOREIGN PATENT DOCUMENTS

CN    1821964 A    8/2006
CN    1848088 A    10/2006
(Continued)

OTHER PUBLICATIONS

"Non-Final Office Action Issued in U.S. Appl. No. 16/403,158", dated Sep. 3, 2020, 12 Pages.
(Continued)

*Primary Examiner* — Brian W Wathen
(74) *Attorney, Agent, or Firm* — Workman Nydegger

(57) ABSTRACT

Using a common reference address when processing calls among a native ABI and a foreign ABI. Based on caller calling using a reference address, a lookup structure is used to determine whether the reference address is within a memory range storing native code (and that the callee is native) or a memory range not storing native code (and that the callee is foreign). Execution of the callee is initiated based on one of (i) when the caller is native and when the callee is foreign, calling the callee using the reference address within an emulator; (ii) when the caller is foreign and the callee is native, calling an entry thunk; (iii) when the caller is native and the callee is foreign, calling an exit thunk; or (iv) when the caller is native and the callee is native, directly calling the callee using the reference address.

20 Claims, 10 Drawing Sheets

(56) References Cited

U.S. PATENT DOCUMENTS

| | | |
|---|---|---|
| 5,122,873 A | 6/1992 | Golin |
| 5,223,701 A | 6/1993 | Chandler et al. |
| 5,301,037 A | 4/1994 | Kang et al. |
| 5,452,456 A | 9/1995 | Mourey et al. |
| 5,502,576 A | 3/1996 | Ramsay et al. |
| 5,619,665 A | 4/1997 | Emma |
| 5,628,016 A | 5/1997 | Kukol |
| 5,638,525 A | 6/1997 | Hammond et al. |
| 5,933,642 A | 8/1999 | Greenbaum et al. |
| 6,055,649 A | 4/2000 | Deao et al. |
| 6,226,789 B1 | 5/2001 | Tye et al. |
| 6,336,178 B1 | 1/2002 | Favor |
| 6,353,483 B1 | 3/2002 | Laverty et al. |
| 6,442,752 B1 | 8/2002 | Jennings et al. |
| 6,470,094 B1 | 10/2002 | Lienhart et al. |
| 6,502,237 B1 | 12/2002 | Yates et al. |
| 6,507,674 B1 | 1/2003 | Yagishita et al. |
| 6,553,429 B1 | 4/2003 | Wentz et al. |
| 6,641,051 B1 | 11/2003 | Illowsky et al. |
| 6,725,779 B2 | 4/2004 | Van et al. |
| 6,731,800 B1 | 5/2004 | Barthel et al. |
| 6,848,111 B1 | 1/2005 | Schwabe et al. |
| 6,880,122 B1 | 4/2005 | Lee et al. |
| 6,920,610 B1 | 7/2005 | Lawton et al. |
| 6,941,024 B2 | 9/2005 | Mukherjee |
| 7,062,087 B1 | 6/2006 | Varga |
| 7,088,866 B2 | 8/2006 | Andrew |
| 7,110,596 B2 | 9/2006 | Simard et al. |
| 7,116,834 B2 | 10/2006 | Malvar |
| 7,120,297 B2 | 10/2006 | Simard et al. |
| 7,148,907 B2 | 12/2006 | Smith et al. |
| 7,219,335 B1 | 5/2007 | Moas et al. |
| 7,281,271 B1 | 10/2007 | Szor |
| 7,319,543 B2 | 1/2008 | Suzuki |
| 7,321,688 B2 | 1/2008 | Fujiwara |
| 7,512,274 B2 | 3/2009 | Simard et al. |
| 7,613,363 B2 | 11/2009 | Platt et al. |
| 7,737,993 B2 | 6/2010 | Kaasila et al. |
| 8,391,638 B2 | 3/2013 | Sykes |
| 8,788,792 B2* | 7/2014 | Yates, Jr. ............... G06F 9/3861 712/209 |
| 9,020,299 B2 | 4/2015 | Sykes |
| 9,448,788 B1 | 9/2016 | Anand et al. |
| 10,303,498 B2 | 5/2019 | Tzen et al. |
| 10,552,207 B2 | 2/2020 | Tamir et al. |
| 10,705,850 B2 | 7/2020 | Teixeira et al. |
| 10,713,213 B2 | 7/2020 | Tamir et al. |
| 2002/0061140 A1 | 5/2002 | Kajiwara |
| 2002/0089549 A1 | 7/2002 | Munro et al. |
| 2002/0099884 A1 | 7/2002 | Chang et al. |
| 2002/0108521 A1 | 8/2002 | Velde et al. |
| 2003/0018961 A1 | 1/2003 | Ogasawara |
| 2003/0023905 A1 | 1/2003 | Boling |
| 2004/0015972 A1 | 1/2004 | Barclay |
| 2004/0088685 A1 | 5/2004 | Poznanovic et al. |
| 2004/0096102 A1 | 5/2004 | Handley |
| 2004/0151376 A1 | 8/2004 | Nomura et al. |
| 2004/0151401 A1 | 8/2004 | Sawhney et al. |
| 2005/0275897 A1 | 12/2005 | Fan et al. |
| 2005/0286752 A1 | 12/2005 | Takiguchi |
| 2005/0286776 A1 | 12/2005 | Bai et al. |
| 2006/0001690 A1 | 1/2006 | Martinez et al. |
| 2006/0062454 A1 | 3/2006 | Fan et al. |
| 2007/0094075 A1 | 4/2007 | Graham et al. |
| 2007/0103731 A1 | 5/2007 | Tse et al. |
| 2007/0229894 A1 | 10/2007 | Siemens et al. |
| 2007/0292049 A1 | 12/2007 | Liu et al. |
| 2008/0159427 A1 | 7/2008 | Kang et al. |
| 2008/0216073 A1 | 9/2008 | Yates et al. |
| 2008/0270990 A1 | 10/2008 | Kornstaedt |
| 2008/0292130 A1 | 11/2008 | Nafarieh et al. |
| 2009/0100416 A1* | 4/2009 | Brown ............... G06F 9/45516 717/153 |
| 2009/0172713 A1 | 7/2009 | Kim et al. |
| 2010/0095284 A1 | 4/2010 | Herring et al. |
| 2011/0066959 A1 | 3/2011 | Harrold et al. |
| 2012/0233593 A1 | 9/2012 | Sahoo et al. |
| 2013/0080805 A1 | 3/2013 | Vick et al. |
| 2013/0096908 A1 | 4/2013 | Cook et al. |
| 2013/0283245 A1 | 10/2013 | Black et al. |
| 2013/0326489 A1* | 12/2013 | Eijndhoven ......... G06F 9/45508 717/139 |
| 2015/0007304 A1 | 1/2015 | Malka et al. |
| 2015/0180858 A1 | 6/2015 | Shanmugam et al. |
| 2015/0277867 A1* | 10/2015 | Hasabnis ............ G06F 9/44521 717/164 |
| 2015/0301848 A1 | 10/2015 | Roehrig et al. |
| 2015/0347108 A1 | 12/2015 | Munshi et al. |
| 2015/0379169 A1* | 12/2015 | Wu ....................... G06F 9/4552 703/26 |
| 2016/0364276 A1* | 12/2016 | Wu ..................... G06F 9/30145 |
| 2017/0115975 A1* | 4/2017 | Rose ........................ G06F 9/541 |
| 2018/0173545 A1* | 6/2018 | Zhong ................... G06F 9/455 |
| 2018/0373514 A1* | 12/2018 | Gordon ................. G06F 8/4441 |
| 2018/0374254 A1 | 12/2018 | Stover et al. |
| 2019/0265993 A1 | 8/2019 | Tzen et al. |
| 2020/0057994 A1 | 2/2020 | Hunn |
| 2022/0137942 A1 | 5/2022 | Sequeira De Justo Teixeira et al. |

FOREIGN PATENT DOCUMENTS

| | | |
|---|---|---|
| CN | 101189578 A | 5/2008 |
| CN | 101523348 A | 9/2009 |
| CN | 102289370 A | 12/2011 |
| CN | 104903859 A | 9/2015 |

OTHER PUBLICATIONS

Shen, et al., "A Retargetable Static Binary Translator for the ARM Architecture", In ACM Transactions on Architecture and Code Optimization, vol. 11, No. 2, Article 18, Jun. 2014, pp. 18.1-18.25.

"Get Yourself Noticed with a Favicon", Retrieved from: http://web.archive.org/web/20080725091442/http://www.fontstuff.com/frontpage/fptut16.htm, Jul. 25, 2008, 4 Pages.

"Intel x86 on Android with Smartface", Retrieved from: http://web.archive.org/web/20140921103340/http://www.smartface.io/intel-x86-on-android-with-smartface/, Sep. 21, 2014, 2 Pages.

"Final Office Action Issued in U.S. Appl. No. 12/133,358", dated Feb. 2, 2012, 15 Pages.

"Non Final Office Action Issued in U.S. Appl. No. 12/133,358", dated Aug. 31, 2011, 14 Pages.

"Final Office Action Issued in U.S. Appl. No. 13/753,427", dated Sep. 11, 2013, 11 Pages.

"Final Office Action Issued in U.S. Appl. No. 13/753,427", dated Jul. 21, 2014, 12 Pages.

"Non Final Office Action Issued in U.S. Appl. No. 13/753,427", dated Feb. 21, 2014, 11 Pages.

"Non Final Office Action Issued in U.S. Appl. No. 13/753,427", dated Apr. 24, 2013, 9 Pages.

"Notice of Allowance Issued in U.S. Appl. No. 13/753,427", dated Dec. 29, 2014, 7 Pages.

"Final Office Action Issued in U.S. Appl. No. 14/873,100", dated Aug. 3, 2018, 11 Pages.

"Non Final Office Action issued in U.S. Appl. No. 14/873,100", dated Jan. 8, 2018, Jan. 8, 2018, 11 Pages.

"Non Final Office Action Issued in U.S. Appl. No. 15/730,713", dated Mar. 19, 2019, 11 Pages.

"Non-Final Office Action Issued in U.S. Appl. No. 15/730,713", dated Oct. 18, 2019, 12 Pages.

"Extended European Search Report Issued in European Patent Application No. 19210044.4", dated Mar. 17, 2020, 9 Pages.

Anthony, Sebastian, "How to run normal x86 Windows apps on your Windows RT tablet", Retrieved from: http://www.extremetech.com/computing/148841-how-to-run-normal-x86-windows-apps-on-your-windows-rt-tablet, Feb. 20, 2013, 5 Pages.

Constantin, Lucian, "Russian Startup working on x86 to ARM software emulator", Retrieved from: https://www.computerworld.com/article/2492175/app-development/russian-startup-working-on-x86-to-arm-software-emulator.html, Oct. 9, 2012, 11 Pages.

(56) References Cited

OTHER PUBLICATIONS

Hao, Leew, "ARM Instruction Set Stimulation on Multi-Core x86 Hardware.", A Thesis Submitted for partial fulfillment to the requirement for an Honours Degree in Computer Science, University of Adelaide, School of Computer Science, Jun. 19, 2009, 70 Pages.
Jiang, JenniferI., "Creating an x86 and ARM* APK using the Intel® Compiler and GNU* gcc", Retrieved from: https://software.intel.com/en-us/android/articles/creating-an-x86-and-arm-apk-using-the-intelr-compiler-and-gnu-gcc, Oct. 15, 2014, 7 Pages.
Kim, et al., "An Efficient Mixed-Mode Execution Environment for c on Mobile Phone Platforms", In Proceedings of the WRI World Congress on Computer Science and Information Engineering, Mar. 31, 2009, pp. 320-328.
"International Search Report and Written Opinion Issued in PCT Application No. PCT/US2016/053687", dated Jan. 11, 2017, 14 Pages.
"Second Written Opinion Issued in PCT Application No. PCT/US2016/053687", dated Sep. 1, 2017, 8 Pages.
"International Preliminary Report on Patentability Issued in PCT Application No. PCT/US2016/053687", dated Oct. 26, 2017, 10 Pages.
"International Search Report and Written Opinion Issued in PCT Application No. PCT/US2018/054271", dated Jan. 22, 2019, 14 Pages.
Sharp, David, "Tarm AC A Dynamically recompiling ARM Emulator", Retrieved from: http://web.archive.org/web/20060115083218/https://www.davidsharp.com/tarmac/tarmacreport.pdf, Jan. 15, 2006, 102 Pages.
Souza, et al., "ISAMAP: Instruction Mapping Driven by Dynamic Binary Translation", In Proceedings of International Symposium on Computer Architecture, Jun. 19, 2010, 11 Pages.
Zhang, Yale, "Project: x86 to ARM binary translator", Retrieved from : https://web.archive.org/web/20110925032545/https://www.winehq.org/pipermail/wine-devel/2011-April/089638.html, Apr. 8, 2011, 3 Pages.
"Notice of Allowance Issued in U.S. Appl. No. 16/403,158", dated Dec. 30, 2020, 11 Pages.
"Notice of Allowance Issued in U.S. Appl. No. 17/008,346", dated Feb. 24, 2021, 12 Pages.
Dhoot, Anubhav Vijay, "Hybrid online/offline optimization of application binaries", A Thesis submitted to the Graduate Faculty of North Carolina State University in partial satisfaction of the requirements for the Degree of Master of Science in Computer Science, Department of Computer Science, Jul. 8, 2004, 53 Pages.
Roy, et al., "Hybrid Binary Rewriting for Memory Access Instrumentation", In Proceedings of the 7th ACM SIGPLAN/SIGOPS International Conference on Virtual Execution Environments, Mar. 9, 2011, 227-238.
"Optimize Options (Using the GNU Compiler Collection (GCC))", Retrieved From: https://web.archive.org/web/20200727054919/htttps://gcc.gnu.org/onlinedocs/gcc/Optimize-Options.html, Jul. 27, 2020, 61 Pages.
"Notice of Allowance Issued in U.S. Appl. No. 17/008,270", dated Sep. 15, 2021, 12 Pages.
"International Search Report & Written Opinion Issued in PCT Application No. PCT/US21/030388", dated Aug. 19, 2021, 14 Pages.
"Office Action Issued in Indian Patent Application No. 201847007466", dated Oct. 5, 2021, 5 Pages.
"First Office Action and Search Report Issued in Chinese Patent Application No. 201680057532.6", dated Aug. 9, 2021, 14 Pages.
"International Search Report and Written Opinion Issued in PCT Application No. PCT/US2021/035057", dated Sep. 27, 2021, 13 Pages.
"International Search Report and Written Opinion Issued in PCT Application No. PCT/US2021/028042", dated Jul. 16, 2021, 14 Pages.
"Notice of Allowance and Search Report Issued in Chinese Patent Application No. 201680057532.6", dated Mar. 30, 2022, 8 Pages.
U.S. Appl. No. 13/753,427, filed Jan. 29, 2013.
U.S. Appl. No. 12/133,358, filed Jun. 4, 2008.
U.S. Appl. No. 16/403,158, filed May 3, 2019.
U.S. Appl. No. 14/873,100, filed Oct. 1, 2015.
U.S. Appl. No. 15/730,713, filed Oct. 11, 2017.
U.S. Appl. No. 17/550,452, filed Dec. 14, 2021.
U.S. Appl. No. 17/008,270, filed Aug. 31, 2020.
U.S. Appl. No. 17/008,346, filed Aug. 31, 2020.
"Notice of Allowance Issued in European Patent Application No. 19210044.4", dated Apr. 22, 2022. 7 Pages.

* cited by examiner

*300b*

Import/Export Table 305

| Function | Location |
|---|---|
| A | Address/Offset 1 |
| B | Address/Offset 2 |
| C | Address/Offset 3 |
| D | Address/Offset 4 |
| E | Address/Offset 5 |
| A' | Address/Offset 6 |
| B' | Address/Offset 7 |
| F | Address/Offset 8 |

Identify A Call To A Callee Function Using A Reference Address
801

Using A Lookup Structure And The Reference Address, Determine Whether The Callee Function Corresponds To A Native ABI Or To A Foreign ABI
802

Initiate Execution Of The Callee Function
803

When Caller Is Foreign And Callee Is Foreign, Directly Call The Reference Address In An Emulator
803a

When Caller Is Foreign And Callee Is Native, Locate And Call An Entry Thunk
803b

When Caller Is Native And Callee Is Foreign, Call An Exit Thunk
803c

When Caller Is Native And Callee Is Native, Directly Call Reference Address
803d

*FIG. 8*

DUAL ARCHITECTURE FUNCTION POINTERS HAVING CONSISTENT REFERENCE ADDRESSES

BACKGROUND

In computing, each processor, or central processing unit (CPU), implements an instruction set architecture (ISA) that describes syntax and rules to which machine code instructions must adhere in order for those instructions to be natively executable on that processor. Examples of contemporary ISAs are the IA-32 ISA designed by INTEL CORPORATION, the x86-64 ISA designed by ADVANCED MICRO DEVICES, INC., the AArch64 ISA designed by ARM LIMITED, the POWER ISA designed by INTERNATIONAL BUSINESS MACHINES CORPORATION, and the RISC-V ISA designed by UNIVERSITY OF CALIFORNIA, BERKELEY, though many additional ISAs exist. Additionally, in computing, an application binary interface (ABI) is an interface between two binary program components that comprise machine code instructions targeting the same ISA. ABIs are often defined by an operating system (OS) and enable third-party software components to target, and therefore interface with, other libraries/components targeting the same ABI. For example, MICROSOFT WINDOWS provides a "Windows-X64" ABI that enables software to target WINDOWS devices comprising processor(s) implementing the x86-64 ISA, and provides an "ARM64" ABI that enables software to target WINDOWS devices comprising processor(s) implementing the Aarch64 ISA.

In general, a software component is "native" to a device that provides (e.g., via an OS) an ABI to which the component is compiled, and which also comprises a processor having an ISA matching the machine code instructions defining that component. Thus, any software component that does not match an ABI provided by a given computing device can be considered to be "foreign" to that device. For example, an application targeting a Linux ABI for x86-64 cannot natively execute on a computing device having a processor targeting the x86-64 ISA but providing only the Windows-X64 ABI. Similarly, an application targeting the Windows-X64 ABI cannot natively execute on a computing device having a processor targeting the x86-64 ISA but providing only a Linux ABI for x86-64.

Additionally, any software component that does not match an ISA of the device's processor(s), can be considered to be "foreign" to that device. For example, an application targeting the x86_64 ISA (regardless of the ABI targeted) cannot natively execute on any computing device having an AArch64 processor. Similarly, an application targeting the AArch64 ISA (regardless of the ABI targeted) cannot natively execute on any computing device having an x86-64 processor.

Some environments, such as WINDOWS, do make it possible to execute foreign software via software-based ISA emulation, with often significant performance penalties. Thus, for example, it may be possible for an application targeting the ARM64 ABI to be emulated on a device having an x86-64 processor via an AArch64 emulator, and/or it may be possible for an application targeting the Windows-X64 ABI to be emulated on a device having an AArch64 processor via an x86-64 emulator.

Even when a given software application is available in multiple ABIs, distribution and use of that application can be a problem. For example, average computer users are not aware of the ISAs and/or ABIs supported by their computing devices, and are therefore not able to make an informed decision as to which version of a program to install on his or her computer, leading to confusion and frustration. Additionally, it is burdensome for a developer to distribute and support multiple versions of the same application to target different ABIs/ISAs. One naïve solution that attempts to address these problems is to support the generation and OS support of what are known as "fat" binaries that include both "native" and "foreign" code streams. Thus, for example, a software vendor may generate and distribute a single fat binary for an application, which includes an AArch64 code stream that is used when the binary is loaded on an AArch64-based device, and an x86-64 code stream that is used when the binary is loaded on an x86-64-based device. While fat binaries largely hide the complexities of different processor ISAs from end-users, this is accomplished by essentially doubling the amount of code that is included in a binary (i.e., a 100% code size increase), half of which is not actually used by a given device. In an era in which portable devices that frequently possess limited amounts of storage space are common, fat binaries can quickly consume precious storage resources and lead to software faults and user dissatisfaction.

Given the broad and diverse ecosystem of devices available today, it is frequently desirable for users to be able to execute foreign software on their computing devices. As such, computer manufacturers and/or OS vendors may be motivated to make execution of foreign software a relatively seamless experience. Some solutions have enabled foreign software to execute via emulation, while enabling that foreign software to interface with native OS libraries. However, these solutions have been limited in that these applications still execute under emulation, rather than natively.

BRIEF SUMMARY

At least some embodiments described herein facilitate generating and/or consuming native binaries (e.g., applications, modules, libraries, etc.) comprising "emulation compatible" (EC) code that is configured for close interoperation with emulated foreign code, and that provides a high level of interoperability and compatibility to the foreign code. For example, the embodiments herein enable an application developer to target an application to an operating system (OS) provided native EC application binary interface (ABI) to produce and distribute applications that execute natively at a computing device.

In embodiments, the EC ABI exhibits many behaviors of a foreign ABI, thereby enabling native code targeting the EC ABI to call (via an emulator) and interoperate with foreign code. Thus, by virtue of the EC ABI, these natively-executed applications are enabled to efficiently and seamlessly (e.g., from the perspective of an end-user) interface with emulated foreign code, such as legacy libraries and plug-ins that are loaded within that application's execution context.

In embodiments, the EC ABI provides context and calling conventions (CCs) for native code that support exception unwinding and/or thread suspensions within emulated foreign code. For example, in embodiments, the EC ABI uses context data and CCs that are compatible with the foreign ABI, while preserving compatibility with context data and CCs expected by an incumbent native ABI.

In embodiments, even though the EC ABI is compatible with the foreign ABI, it preserves enough compatibility with the incumbent native ABI that much of code compiled against the EC ABI is identical to code compiled against the incumbent native ABI. This facilitates "folding" of that code within a hybrid binary that supports both the incumbent native ABI (which enables the binary to be consumed by legacy systems that are aware of the incumbent native ABI but not the EC ABI) and the EC ABI (which enables enhanced interoperability with emulated foreign code on enlightened systems that are aware of the EC ABI).

Notably, in the embodiments herein, there are potentially three entry points of a function compiled to the EC ABI. First, the function could be entered by its 'real' address, if it is being called by another EC ABI function. Second, the function could be entered via an "entry thunk," if it is being called by the foreign ABI. Third, the function could be entered via a "fast-forward sequence," if the function has been modified at runtime by code executing under the foreign ABI. Regardless of the actual entry point taken to a function, when code compiled against the EC ABI and code compiled against the foreign ABI interact, embodiments permit functions to have consistent memory address references when crossing ABI boundaries, improving compatibility.

One or more embodiments are directed to methods, systems, and computer program products for compiling source code to a binary file targeting a native first instruction set architecture (ISA) while being operable with code compiled to a foreign second ISA. In these embodiments, a computer system identifies (i) a first ABI corresponding to the first ISA, (ii) a second ABI corresponding to the first ISA, and (iii) a third ABI corresponding to the second ISA. The second ABI (i) defines a first context data format that has a first size that does not exceed second size of a second context data format used by the third ABI, and (ii) defines use of a subset of registers from among a plurality of registers of the first ISA and that are used by the first ABI, the subset of registers being mapped to a set of registers of the second ISA that are used by the third ABI, use of the subset of registers by the second ABI resulting in at least a portion of functions being foldable when compiled using each of the first ABI and the second ABI. For a function defined in the source code, the computer system generates a first compiled version of the function that targets the first ABI, including generating a first set of instructions in the first ISA, and generates a second compiled version of the function that targets the second ABI, including generating a second set of instructions in the first ISA. The computer system determines whether the first compiled version of the function and the second compiled version of the function are foldable within the binary file, based at least on determining whether the first set of instructions and the second set of instructions match. Based at least on determining whether the first compiled version of the function and the second compiled version of the function are foldable within the binary file, the computer system either (i) emits both the first compiled version of the function and the second compiled version of the function into the binary file (i.e., when the first compiled version of the function and the second compiled version of the function are determined to not be foldable within the binary file), or (ii) emits only one of the first compiled version of the function or the second compiled version of the function into the binary file (i.e., when the first compiled version of the function and the second compiled version of the function are determined to be foldable within the binary file).

One or more embodiments are also directed to methods, systems, and computer program products for generating a hybrid binary image, the hybrid binary image being executable under both a native ABI and a compatibility ABI. In these embodiments, based at least on identifying a first machine type corresponding to the native ABI, a computer system emits the first machine type into a machine type field of the hybrid binary image. The machine type field is structured to be utilized when the hybrid binary image is loaded by a native process executing under the native ABI. Based at least on identifying a non-foldable first function, the computer system also emits, into the hybrid binary image, both of (i) a first compiled version of the first function that is executable under the native ABI, and (ii) a second compiled version of the first function that is executable under the compatibility ABI. Based at least on identifying a foldable second function, the computer system also emits into the hybrid binary image a compiled version of the second function that is executable under both of the native ABI and the compatibility ABI. The compiled version of the second function is structured to call the first compiled version of the first function when the hybrid binary image is loaded by the native process. The computer system also emits, into the hybrid binary image, a fixup table that is structured to be utilized when the hybrid binary image is loaded by a compatibility process executing under the compatibility ABI. The fixup table defines a plurality of transformations to memory loaded from the hybrid binary image, including a first transformation that adjusts the machine type field to comprise a second machine type corresponding to the compatibility ABI, and a second transformation that configures the compiled version of the second function to call the second compiled version of the first function instead of the first compiled version of the first function.

One or more embodiments are also directed to methods, systems, and computer program products for consuming a hybrid binary image by a process executing under a compatibility ABI, the hybrid binary image being executable under both a native ABI and the compatibility ABI. In these embodiments, during loading of the hybrid binary image, a computer system determines that a first machine type stored in a machine type field of the hybrid binary image mismatches a second machine type corresponding to the compatibility ABI under which the process is executing. Based on determining that the first machine type mismatches the second machine type, the computer system locates, within the binary image, a fixup table defining a plurality of transformations to memory loaded from the hybrid binary image. The computer system then applies at least a portion of the plurality of transformations to the memory loaded from the hybrid binary image, including applying at least a first transformation that adjusts the machine type field to comprise a second machine type corresponding to the compatibility ABI, and a second transformation that modifies a call site calling a first compiled version of a non-folded function that is executable under the native ABI to instead call a second compiled version of the non-folded function that is executable under the compatibility ABI.

One or more embodiments are also directed to methods, systems, and computer program products for using a common reference memory address when processing calls within a process that supports execution of both (i) native code targeting a native ABI that corresponds to a native ISA and that has a first CC, and (ii) foreign code targeting a foreign ABI that corresponds to a foreign ISA and that has a second CC. In these embodiments, based at least on identifying a call that targets a reference memory address for a callee function, a computer system determines whether the callee function corresponds to the native ABI or to the foreign ABI. The callee function is determined to correspond to the native ABI based on one of (i) a lookup structure indicating that the reference memory address is contained within a first memory range storing native code, or (ii) a fast-forward sequence being identified at the reference memory address. The callee function is determined to correspond to the foreign ABI based at least on the lookup structure indicating that the reference memory address is contained within a second memory range not storing native code. Based at least on the determining, the computer system initiates execution of the callee function based on performing one of (A) when a caller function corresponds to the foreign ABI, and when the callee function is determined to correspond to the foreign ABI, directly calling the callee function using the reference memory address within an emulator; (B) when the caller function corresponds to the foreign ABI, and when the callee function is determined to correspond to the native ABI, calling an entry thunk that (i) adapts a second CC to the first CC and then (ii) directly calls the callee function using the reference memory address; (C) when the caller function corresponds to the native ABI, and when the callee function is determined to correspond to the foreign ABI, calling an exit thunk that (i) adapts a first CC of the native ABI to a second CC of the foreign ABI and then (ii) invokes the emulator to directly call the callee function using the reference memory address; or (D) when the caller function corresponds to the native ABI, and when the callee function is determined to correspond to the native ABI, directly calling the callee function using the reference memory address.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3B illustrates an example of a windowed view of an import and/or export table;

FIG. 8 illustrates a flow chart of an example method for using a common reference memory address when processing calls within a process that supports execution of both (i) native code targeting a native application binary interface (ABI) that corresponds to the native ISA and that has a first CC, and (ii) foreign code targeting a foreign ABI that corresponds to a foreign ISA and that has a second CC.

DETAILED DESCRIPTION

Figure 1:
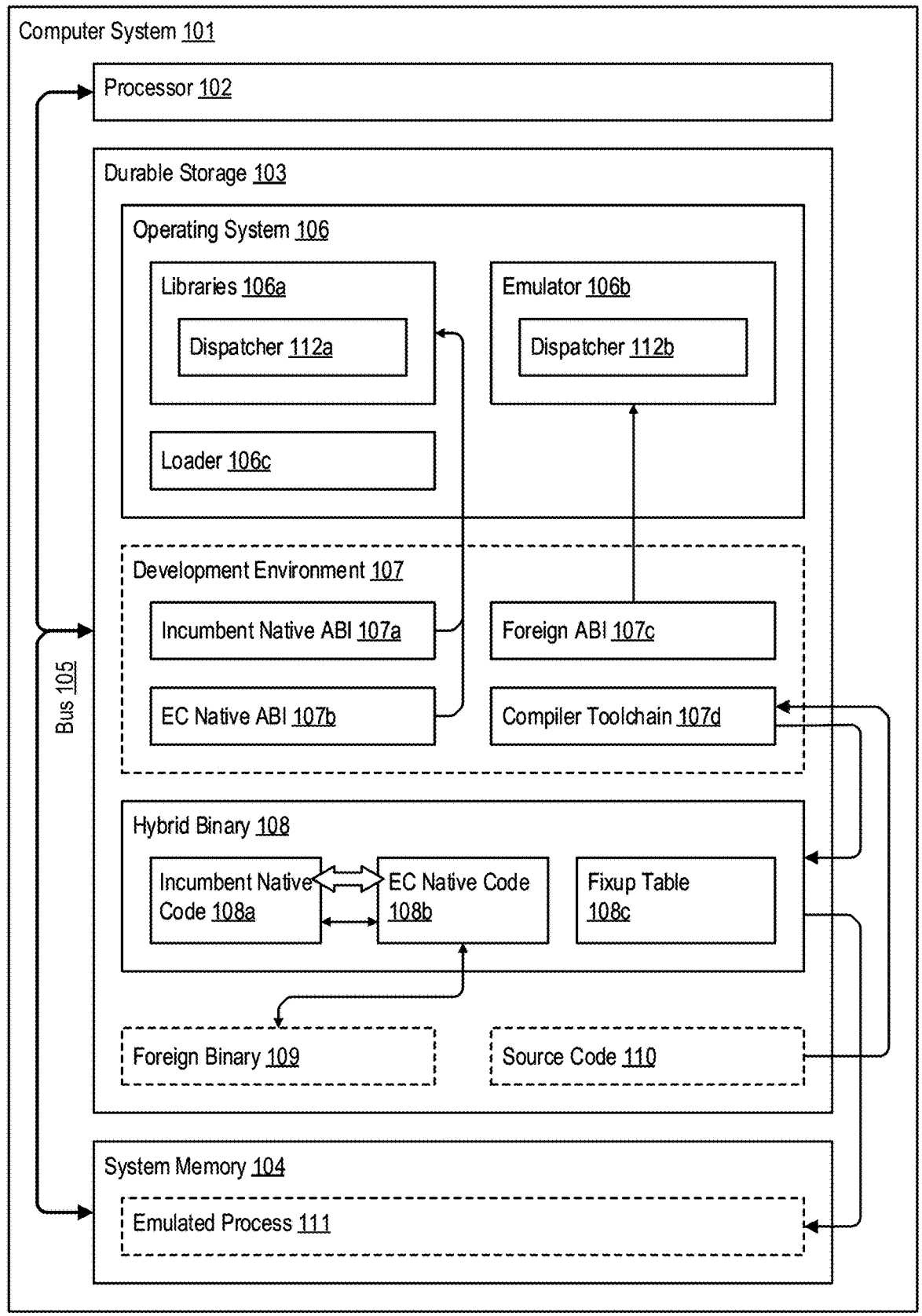
FIG. 1 illustrates an example computer system that facilitates generating and/or consuming native binaries comprising emulation compatible (EC) code that is configured for close interoperation with emulated foreign code, and that provides a high level of interoperability and compatibility to the foreign code.

FIG. 1 illustrates an example computer system 101 that facilitates generating and/or consuming native binaries (e.g., applications, modules, libraries, etc.) comprising "emulation compatible" (EC) code that is configured for close interoperation with emulated foreign code, and that provides a high level of interoperability and compatibility to the foreign code. Computer system 101 additionally facilitates generating and/or consuming native binaries that, while comprising EC code, are still compatible with "legacy" computing devices that are not aware of the EC features contained within these binaries.

In general, computer system 101 operates based on an EC native application binary interface (ABI) that exhibits many behaviors of a foreign ABI, thereby enabling native code targeting the EC native ABI to call (via an emulator) and interoperate with foreign code, such as legacy plug-ins, libraries, etc. In embodiments, the EC native ABI provides context and calling conventions (CCs) for native code that support exception unwinding and/or thread suspensions within emulated foreign code. For example, in embodiments, the EC native ABI uses context data and CCs that are compatible with the foreign ABI, while preserving compatibility with context data and CCs expected by an incumbent native ABI. In doing so, much of code compiled against the EC native ABI is identical to code compiled against the incumbent native ABI, facilitating "folding" of that code within a hybrid binary that supports both the incumbent native ABI (which enables the binary to be consumed by legacy systems that are aware of the incumbent native ABI but not the EC native ABI) and the EC native ABI (which enables enhanced interoperability with emulated foreign code on enlightened systems that are aware of the EC native ABI). Additionally, when code compiled against the EC native ABI and code compiled against the foreign ABI interact, embodiments permit functions to have consistent memory address references when crossing ABI boundaries, improving compatibility.

In embodiments, computer system 101 comprises or utilizes special-purpose or general-purpose computer hardware, such as, for example, a processor 102 (or a plurality of processors), durable storage 103, and system memory 104 which are communicatively coupled using a communication bus 105. In computer system 101, the processor 102 may implement any available processor instruction set architecture (ISA), such as x86-64, AArch64, POWER, RISC-V, etc., which is referred to herein as the "native" ISA of the processor 102. Any ISA not matching the native ISA of the processor 102 is referred to herein as a "foreign" ISA. In general, the ISA of the processor 102 defines many hardware aspects of the processor 102, such as the syntax of machine code instructions that are executable by the processor 102, a set of registers that are exposed by the processor 102 for use by those machine code instructions, a memory model used by the processor 102, and the like. Thus, for example, if processor 102 were to implement the AArch64 ISA, then it would execute a different set of machine code instructions (including, for example, one or more of instructions available, instruction format, etc.), and expose a different set of registers (including, for example, one or more of register name, register size, a number of registers, etc.), than if the processor 102 were to implement the x86-64 ISA.

The durable storage 103 stores computer-executable instructions and/or data structures representing executable software components; correspondingly, during execution of this software at the processor(s) 102, one or more portions of these computer-executable instructions and/or data structures are loaded into system memory 104. For example, the durable storage 103 is shown as potentially storing computer-executable instructions and/or data structures corresponding to an operating system 106, a development environment 107, a hybrid binary 108, a foreign binary 109, and source code 110.

The system memory 104 is capable of storing a broad variety of data, which can be loaded from durable storage 103, stored by the processor 102, and/or sourced from some other location such as a network device (not shown). In general, computer system 101 operates by loading memory pages defined by one or more binary images stored on durable storage 103 (e.g., hybrid binary 108, foreign binary 109, etc.) into system memory 104, and operating on those memory pages (as loaded into system memory 104) using the processor 102. This includes including executing machine code instructions stored within those memory page(s) to operate on data stored within those memory page(s).

The operating system 106 (referred to hereinafter as OS 106) includes libraries 106a, such as libraries supporting execution of application binaries targeting one or more ABIs that use the native ISA of the processor 102. As indicated by arrows originating from the development environment 107, in some embodiments the libraries 106a include support for an incumbent native ABI 107a (referred to hereinafter as incumbent ABI 107a) and an EC native ABI 107b (referred to hereinafter as EC ABI 107b), which are described in more detail later. The OS 106 also includes a loader 106c for loading binary images into system memory 104, and which is aware of both the incumbent ABI 107a and the EC ABI 107b. Thus, based on possessing libraries 106a and loader 106c, the OS 106 supports consumption of native binaries (e.g., applications, modules, libraries, etc.) that comprise code targeting the one, or both, of the incumbent ABI 107a or the EC ABI 107b.

In embodiments, the OS 106 also includes an emulator 106b which, as indicated by arrows originating from the development environment 107, supports execution of binaries targeting a foreign ABI 107c (e.g., based on a foreign ISA), via emulation. In embodiments, the emulator 106b is configured for interoperation with the libraries 106a, including libraries providing the EC ABI 107b. Thus, based on possessing emulator 106b, the OS 106 supports execution of foreign binaries (e.g., applications, modules, libraries, etc.) that comprise code targeting the foreign ABI 107c.

As used herein, the term "emulation" can encompass translation and/or interpretation. For example, with ahead-of-time (AOT) translation, foreign ISA instructions are translated into native ISA instructions and are persisted into storage (e.g., durable storage 103); these translated instruction are then summoned when needed for runtime. In general, AOT translation happens before a program is requested to be executed, such as when the application is installed. In another example, with just-in-time (JIT) translation, foreign ISA instructions are translated into native ISA instruction as the execution of foreign ISA instructions is requested (e.g., when a user runs the program). With JIT translation, translated native code is immediately executed once it is translated from foreign code. In embodiments, JIT translation happens in pieces, as more foreign code is "discovered" for execution. In embodiments, JIT translation of the same block of foreign ISA code is only conducted once, so if the code is executed more than once the cost of translation is only incurred once. In yet another example, with interpretation foreign ISA instructions are read as execution is required, and the equivalent function is performed by an interpreter, but corresponding native ISA code is not generated. Since foreign code is not translated under interpretation, if the same foreign ISA function is executed twice, then the cost of interpretation is incurred twice.

The development environment 107 supports creation of binaries that target at least the EC ABI 107b, but frequently also target the incumbent ABI 107a (i.e., as a dual-architecture or "hybrid" binary image). In embodiments, the development environment 107 even supports creation of binaries that further target the foreign ABI 107c (and are therefore directly executable on a computer system for which the foreign ABI 107c is native). In embodiments, the incumbent ABI 107a is a "legacy" ABI that targets the native ISA of the processor 102, and the foreign ABI 107c is an ABI that targets some foreign ISA. The EC ABI 107b, on the other hand, is a native ABI for the processor 102, but defines context data and CCs that mirror, or at least share some attributes with, the foreign ABI 107c. Thus, in embodiments, the incumbent ABI 107a can be viewed as defining fully "native" data structures and behaviors, and the EC ABI 107b—while also being native—can be viewed as sharing at least some data structure attributes and behaviors with the foreign ABI 107c. In one example, the incumbent ABI 107a is the ARM64 ABI targeting the AArch64 ISA, the foreign ABI 107c is the Windows-X64 ABI targeting the x86-64 ISA, and the EC ABI 107b targets the AArch64 ISA but includes context data and CCs at least partially mirroring the Windows-X64 ABI. In embodiments, the EC ABI 107b defines enough context data and CCs that mirror or map to the foreign ABI 107c to enable emulated foreign code and EC native code to interact at a very low level, but also has enough in common with the incumbent ABI 107a (e.g., a set of available registers) to result in compilation of a least a portion of source functions to each of the incumbent ABI 107a and the EC ABI 107b to result in identical compiled function bodies. When compiled function bodies are identical, they can be considered "foldable" such that only one function body is actually included in a resulting binary, and that single function body is used by both a code stream targeting the incumbent ABI 107a and a code stream targeting the EC ABI 107b (e.g., via pointer aliasing).

Figure 2:
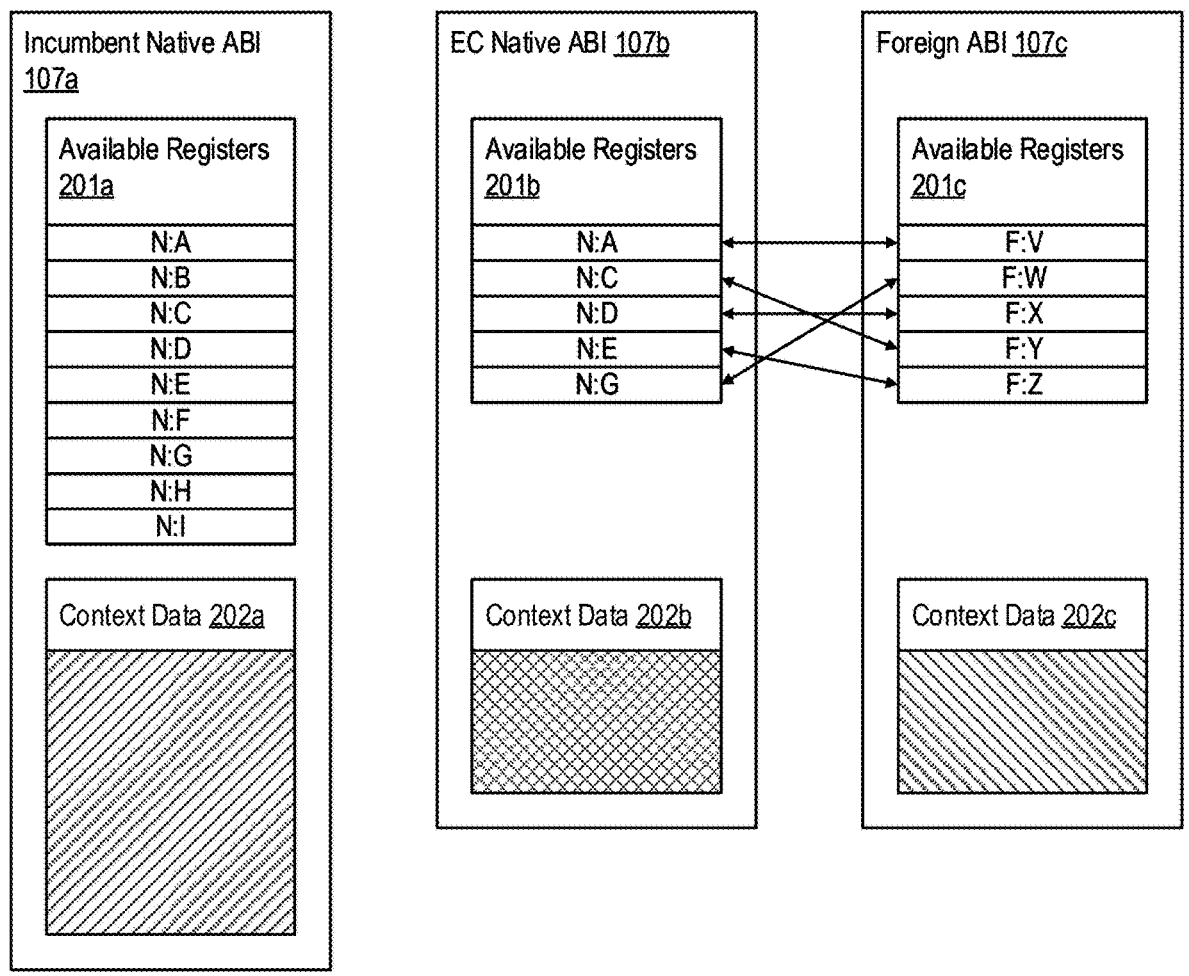
FIG. 2 illustrates an example of an EC native application binary interface (ABI) that defines context and calling conventions (CCs) that mirror a foreign ABI, while remaining compatible with an incumbent native ABI.

In order to further demonstrate embodiments of the EC ABI 107b, FIG. 2 illustrates an example 200 of an EC native ABI that defines context and CCs that mirror a foreign ABI, while remaining compatible with an incumbent native ABI. Initially, FIG. 2 shows a representation of each of the incumbent ABI 107a, the EC ABI 107b, and the foreign ABI 107c from FIG. 1. As shown, the incumbent ABI 107a defines a set of nine available registers 201a comprising registers N:A to N:I, which are assumed in example 200 to be all available registers in the native ISA. The foreign ABI 107c, on the other hand, defines a set of five available registers 201c comprising registers F:V to F:Z, which are assumed in example, 200 to be all available registers in the foreign ISA. As an analogy, the AArch64 ISA (e.g., the "native" ISA) the defines 31 general-purpose 64-bit registers, while the x86-64 ISA (e.g., the "foreign" ISA) defines 16 general-purpose 64-bit registers. The EC ABI 107b bridges the incumbent ABI 107a and the foreign ABI 107c by defining a set of five available registers 201b comprising registers N:A, N:C, N:D, N:E, and N:G. Thus, even though the native ISA has nine registers available, in example 200 the EC ABI 107b is restricted to only use five of these registers—which is a number corresponding to the number of registers available in the foreign ISA. As will be appreciated by one of ordinary skill in the art, even though native code targeting the EC ABI 107b may not use all registers defined by the native ISA, that native code is still executable on the native ISA. Thus, the EC ABI 107b can define use of available registers 201b in a manner that is compatible with the incumbent ABI 107a, such that native code targeting the EC ABI 107b is also executable under a system supporting only the incumbent ABI 107a.

In embodiments, the set of available registers 201b is chosen to use registers most commonly used by code compiled against the incumbent ABI 107a. Thus, even though, in example 200, the set of available registers 201b uses less than all of the set of available registers 201a, code compiled while targeting the set of available registers 201a may frequently only actually uses registers that are selected from the set of available registers 201b. In these situations, code compiled against each of the incumbent ABI 107a and the EC ABI 107b is identical, and can be folded withing a resulting binary. Notably while, in example 200, the set of available registers 201b of the EC ABI 107b comprises less that all of the set of available registers 201a of the incumbent ABI 107a, alternate examples may define the set of available registers 201b to use all of the set of available registers 201a (for example, if the foreign ISA has a number of registers matching the native ISA).

In addition, arrows within FIG. 2 show that a mapping has been defined between the available registers 201b of the EC ABI 107b and the available registers 201c of the foreign ABI 107c. Thus, for example, the EC ABI 107b uses register N:A in a manner that mirrors the foreign ABI 107c's use of register F:V, the EC ABI 107b uses register N:C in a manner that mirrors the foreign ABI 107c's use of register F:W, and so on. In one example, the EC ABI 107b defines use of available registers 201b in manner that mirrors CCs used by the foreign ABI 107c. For example, the EC ABI 107b may limit a number of registers that are available (i.e., as compared to the incumbent ABI 107a) for passing parameters to a function in order to achieve behaviors of the foreign ABI 107c. As an analogy, the X64 ABI only uses four registers to pass parameters, so the EC ABI 107b may only permit four registers to be used for passing parameters, even though the incumbent ARM64 ABI is defined to use additional registers for parameter passing purposes. Additionally, the EC ABI 107b may mirror stack use by the foreign ABI 107c (e.g., for saving a return address, for returning values from a function, etc.) rather than using registers for that purpose (as may be the case for the incumbent ABI 107a). In embodiments, the mappings between registers includes a mapping of volatility between registers. Thus, for example, a register in the native ISA that is considered non-volatile under the incumbent ABI 107a might be considered volatile by the EC ABI 107b if it is mapped to a register considered volatile by the foreign ABI 107c.

FIG. 2 also shows that the incumbent ABI 107a defines context data 202a, the EC ABI 107b defines context data 202b, and the foreign ABI 107c defines context data 202c. In embodiments, context data is a format defined by an ABI for storing a snapshot of processor context, such as registers and flags. This context data usable for a variety of purposes, such as for an application to observe its own state (e.g., as part of copy protection schemes, as part of virus or malware detection, etc.), for an exception unwinding routine to unwind a stack after an exception, or to facilitate thread suspension/resumption. As demonstrated by a visual size of each of context data 202a, context data 202b, and context data 202c, in embodiments the EC ABI 107b defines a format of context data 202b (e.g., a selection and arrangement of available registers 201b) that does not exceed a size of context data 202c used by the foreign ABI 107c—even though the incumbent ABI 107a may define context data 202a exceeding this size. By defining context data 202b to not exceed a size of context data 202c, interoperability between the EC ABI 107b and the foreign ABI 107c is enabled. For example, if an application executing under the foreign ABI 107c allocates a memory buffer for storing a format of context data 202c, and that memory buffer is filled by the EC ABI 107b using a format of context data 202b (e.g., as part of handing an exception), then the context data 202b written by the EC ABI 107b does not exceed the allocated memory buffer.

In some embodiments, context data 202b is defined to have a format that is a blend of context data 202a and context data 202c. For example, a format of context data 202a is visually represented with forward diagonal lines, while a format of context data 202c is visually represented with backward diagonal lines. Then, a format of context data 202b is visually represented with both forward and backward diagonal lines, representing at least a partial blending of formats. For example, even though context data 202b defines an arrangement of registers of the native ISA, it may arrange those registers in a manner that is expected by the foreign ISA (e.g., based on the mappings shown between available registers 201b and available registers 201c).

Notably, when defining the EC ABI 107b (including one or more of the available registers 201b, the context data 202b, or mappings between available registers 201b and available registers 201c), there can be tradeoffs between defining the EC ABI 107b as more closely resembling the incumbent ABI 107a versus defining the EC ABI 107b as more closely resembling the foreign ABI 107c. For example, the more closely the EC ABI 107b resembles the incumbent ABI 107a, the more likely it is that code compiled to the EC ABI 107b can be "folded" with code compiled to the native ABI 107a; however, this may also make it more likely that ABI translations (via entry and/or exit thunks, discussed later) will need to be employed when transitioning between the EC ABI 107b and the foreign ABI 107c. Conversely, the more closely the EC ABI 107b resembles the foreign ABI 107c, the more likely it is that native code in the EC ABI 107b and foreign code in the foreign ABI can interact without use of ABI translations (thunks); however, this may also make it more likely that code compiled to the EC ABI 107b cannot be "folded" with code compiled to the native ABI 107a.

Returning to FIG. 1, in some embodiments, the development environment 107 supports creation of "dual architecture" hybrid binaries that target two or more ABIs. For example, as indicated by various arrows, FIG. 1 shows that a compiler toolchain 107d consumes source code 110 in order to generate a hybrid binary 108 that includes code targeting both the incumbent ABI 107a (i.e., incumbent native code 108a) and the EC ABI 107b (i.e., EC native code 108b). Thus, while containing only native code, the hybrid binary 108 can be viewed as targeting both incumbent native behavior (i.e., incumbent native code 108a) and as targeting foreign behavior (i.e., EC native code 108b). Although not shown, in some embodiments hybrid binaries also include code targeting one or more additional ABIs, such as the foreign ABI 107c.

In FIG. 1, there is a broad arrow between incumbent native code 108a and EC native code 108b, indicating that the incumbent native code 108a and the EC native code 108b are at least partially "folded" together (i.e., such that a single set of instructions are used by both the incumbent native code 108a and the EC native code 108b). As discussed, even though the EC ABI 107b targets at least some foreign behaviors, it has enough in common with the incumbent ABI 107a to result in compilation of a least a portion of source functions to each of the incumbent ABI 107a and the EC ABI 107b to result in identical compiled function bodies. In embodiments, when compilation of a function to each of the incumbent ABI 107a and the EC ABI 107b results in the same compiled code, the compiler toolchain 107d "folds" this function within the hybrid binary 108—emitting only a single compiled version of this function for use by both the incumbent native code 108a and the EC native code 108b. For example, even though the compiler toolchain 107d generates both an incumbent native "version" of compiled code and an EC native "version" of compiled code for the function, compiler toolchain 107d emits only one of these versions into the hybrid binary 108 when those "versions" match (i.e., have identical native code). In testing, the inventors have observed that, due to code folding, supporting dual ABIs (i.e., incumbent ABI 107a and EC ABI 107b) in this manner has results in only a 10-30% increase in binary size versus binary targeting a single ABI. This is in stark contrast to traditional fat binaries, which—lacking the ability to fold code—would have close to a 100% increase in binary size.

In embodiments, when compiling source code 110 to target the EC ABI 107b, the compiler toolchain 107d follows source code definitions—such as preprocessor directives—as if the compiler toolchain 107d were targeting the ISA of the foreign ABI 107c (even though the compiler toolchain 107d is generating native code). This is because the EC ABI 107b exhibits behaviors of the foreign ABI 107c. For example, the following function follows different logic paths depending on the target ABI:

int function1(int x) {
    #if defined (_ARM64_)
      return x+10;
    #else
      return x-2;
    #endif
    }

In particular, preprocessor directives define that the value of 10 should be added to 'x' when targeting the ARM64 ISA, and that the value of 2 should be subtracted from 'x' when not targeting the ARM64 ISA. In embodiments, when compiling this function to target an incumbent ABI 107a using the ARM64 ISA, the compiler toolchain 107d generates instructions that add the value of 10 to 'x' (i.e., the ARM64 logic path); conversely, when compiling this function to target EC ABI 107b the compiler toolchain 107d generates instructions that subtract the value of 2 from 'x' (i.e., the non-ARM64 logic path).

In embodiments, the hybrid binary 108 is configured by the compiler toolchain 107d to be natively parsed and utilized by a legacy loader (i.e., that is aware of the incumbent ABI 107a but not the EC ABI 107b), but to be usable by an enlightened loader (i.e., that is aware of the EC ABI 107b). In embodiments, the hybrid binary 108 uses a layout/format that is expected by a legacy loader and thus "defaults" to executing under the incumbent ABI 107a. However, the hybrid binary 108 also includes additional information, such as a fixup table 108c that enables the hybrid binary 108 to also be consumed by the EC ABI 107b.

Figure 3A:
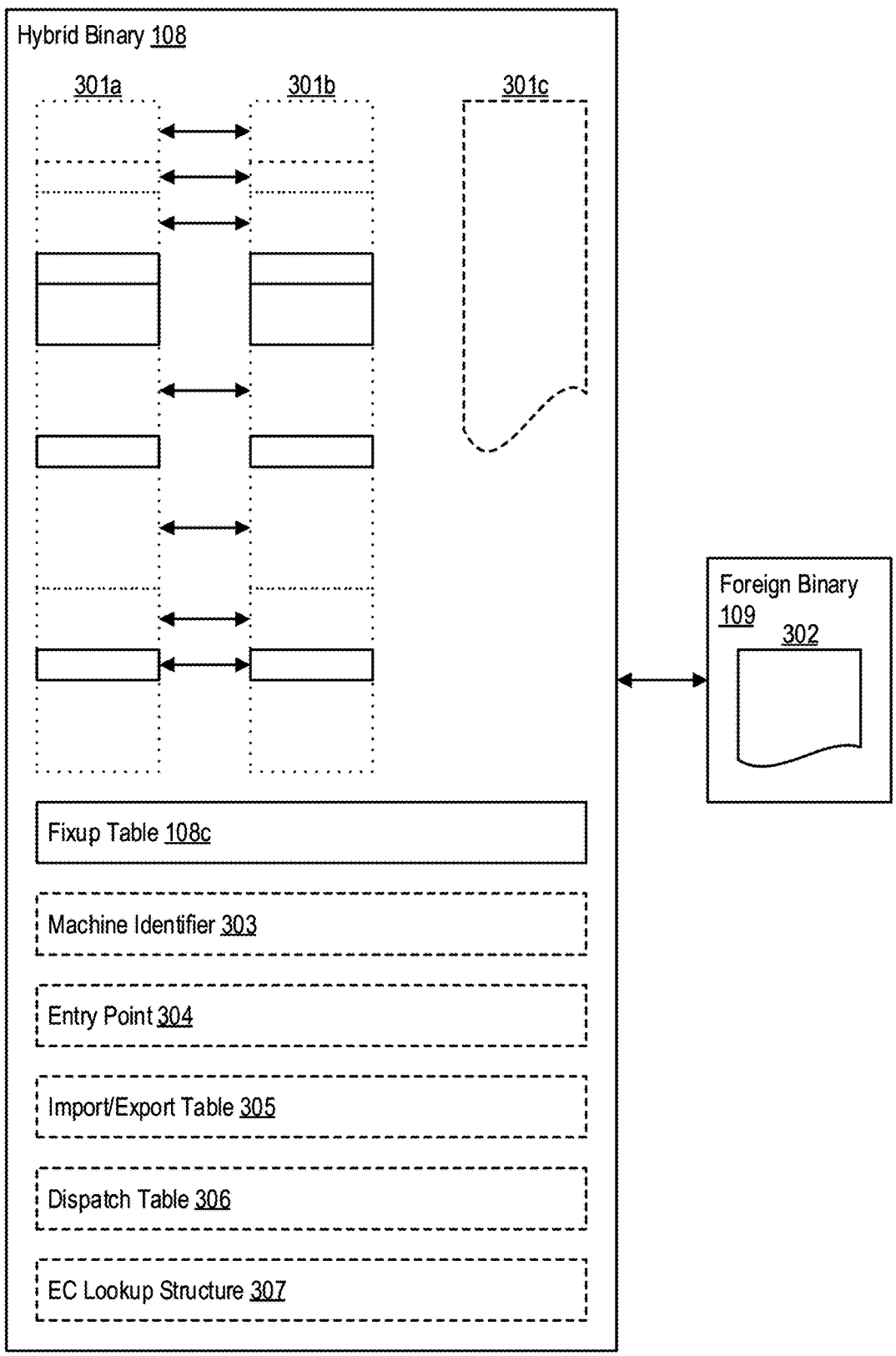
FIG. 3A illustrates an example of a dual-architecture hybrid binary.

FIG. 3A illustrates an example 300a of a "dual architecture" hybrid binary. More particularly, FIG. 3A illustrates a more detailed representation of hybrid binary 108 from FIG. 1, showing two interrelated code streams—code stream 301a and code stream 301b. In embodiments, code stream 301a corresponds to incumbent native code 108a, and code stream 301b corresponds to EC native code 108b. Thus, hybrid binary 108 targets two different native ABIs (i.e., incumbent ABI 107a and EC ABI 107b), together with their differing behaviors (i.e., full native behaviors and foreign behaviors). As indicated by arrows between code stream 301a and code stream 301b, there is a folding of functions between some functions. In particular, each of code stream 301a and code stream 301b includes "non-folded" functions delineated as boxes having solid lines, indicating that a different compiled version of these functions exists in each of code stream 301a and code stream 301b. However, each of code stream 301a and code stream 301b also include "folded" functions delineated as boxes having broken lines and connected by arrows, indicating that only one version of each function exists for use by both code stream 301a and code stream 301b (e.g., via aliasing). FIG. 3A shows that the hybrid binary 108 might include an additional code stream 301c, such as a foreign code stream. More typically, however, in embodiments the hybrid binary 108 interacts with a foreign binary 109 (e.g., corresponding to a legacy plug-in/library) that includes a foreign code stream 302.

As mentioned, in embodiments, the hybrid binary 108 is configured for native execution by the incumbent ABI 107a. For example, a machine identifier 303 field in the hybrid binary 108 identifies a machine type expected by the incumbent ABI 107a, an entry point 304 specifies an entry point to code stream 301a, and any import and/or export tables (input/export table 305) provide a "native" view exposing functions (and their locations) that are relevant to the incumbent ABI 107a. In addition, any "folded" functions that call a non-folded function are configured to call the "incumbent" version of the function in code stream 301a, rather than the "EC" version in code stream 301b. As such, a legacy loader need only load the hybrid binary 108 as it would any other compatible binary, in order to execute code stream 301a.

In order to facilitate loading by an enlightened loader (e.g., loader 106c), FIGS. 1 and 3A illustrate that the hybrid binary 108 includes a fixup table 108c. In embodiments, the fixup table 108c specifies one or more memory transformations to be applied by the loader 106c to memory loaded from the hybrid binary 108 when the hybrid binary 108 is loaded into an emulated process 111 (e.g., a compatibility process which can execute EC native code 108b natively at the processor 102, as well as execute foreign code—such as foreign binary 109—via the emulator 106b).

In embodiments, the loader 106c locates the fixup table 108c upon recognizing a that the machine identifier 303 in the hybrid binary 108 is improper for the EC ABI 107b. Then, the loader 106c applies one or more transformations specified in the fixup table 108c to portion(s) of system memory 104 containing memory page(s) loaded from the hybrid binary 108, in order to execute code stream 301b rather than code stream 301a. In embodiments, each transformation specified in the fixup table 108c identifies a memory location (e.g., by relative address, by absolute address, etc.), together with a transformation to be applied at that memory location (e.g., to replace one or more bytes at the memory location, to apply an arithmetic operation at the memory location, etc.). In embodiments, the fixup table 108c comprises one or more fixups to adjust the machine identifier 303 to match an ISA of a process (e.g., emulated process 111) into which the hybrid binary 108 is loaded. In embodiments, this is a foreign ISA corresponding to the foreign ABI 107c. In embodiments, the fixup table 108c comprises one or more fixups to adjust the entry point 304 to specify an entry point to code stream 301b. In embodiments, the fixup table 108c comprises one or more fixups to cause folded functions to call the EC version of a non-folded function in code stream 301b rather than the incumbent version of the function in code stream 301a. In embodiments, the fixup table 108c comprises one or more fixups that cause an import/export table 305 to provide a "compatibility" view exposing functions (and their locations) that are relevant to the EC ABI 107b.

In some embodiments, causing folded functions to call the EC version of a non-folded function in code stream 301b rather than the incumbent version of the function in code stream 301a comprises patching the call in the folded function, itself. In other embodiments, however, folded functions are configured to call non-folded functions indirectly via a dispatch table 306. In these embodiments, the fixup table 108c comprises one or more fixups to this dispatch table 306, which replace an address or offset to the incumbent version of the function in code stream 301a with an address or offset to the EC version of the function in code stream 301b. In embodiments, use of a dispatch table 306 can provide efficiency by limiting the number of memory pages to which memory fixups need to be applied in order to execute code stream 301b rather than code stream 301a.

In some embodiments, causing the import/export table 305 to provide a "compatibility" view exposing functions (and their locations) that are relevant to the EC ABI 107b comprises patching a reference to the import/export table 305 to expose a different portion (window) of the import/export table 305. To illustrate this concept, FIG. 3B illustrates an example 300b of a windowed view of an import/export table. In particular, FIG. 3B illustrates an import/export table 305 that maps a plurality of functions with their corresponding memory location (e.g., address or offset). In example 300b, import/export table 305 includes a first shaded portion/zone comprising functions (i.e., A, B, and C) that are appliable to only code stream 301a (e.g., as non-folded functions), a non-shaded portion/zone comprising functions (i.e., D and E) that are appliable to both code stream 301a and code stream 301b (e.g., as folded functions), and a second shaded portion/zone comprising functions (i.e., A', B', and F) that are appliable to only code stream 301b (e.g., as non-folded functions). Brackets delineate a native view 307a of import/export table 305 and a compatibility view 307b of import/export table 305. In embodiments the native view is specified as a base reference to the first entry of the import/export table 305 and a size/count (e.g., of 5), which includes functions A, B, and C (applicable to only code stream 301a) as well as functions D and E (applicable to both code streams). In embodiments the compatibility view is specified as a base reference to the fourth entry of the import/export table 305 and a size/count (e.g., of 5), which includes functions D and E (applicable to both code streams) as well as functions A', B', and F (applicable to only code stream 301b). Thus, in embodiments, patching the base reference to the import/export table 305 to expose a different window of the import/export table 305 comprises patching one, or both, of the base reference or the size/count.

As mentioned, the EC ABI 107b facilitates interoperability with the foreign ABI 107c, such as to execute a legacy plugin/library (via emulation) within the context of an application executing natively under the EC ABI 107b. This includes enabling functions in EC native code 108b to call functions in foreign code (e.g., code stream 302 in foreign binary 109), and enabling functions in foreign code to call functions in EC native code 108b. Since foreign code executes under an emulator 106b, there is a transition into, or out of, the emulator 106b for each of these cross-ABI function calls. In embodiments, a hybrid binary 108 may include entry thunks for transitioning from the foreign ABI 107c to the EC ABI 107b (i.e., when code in the foreign binary 109 calls a function in EC native code 108b), and exit thunks for transitioning from the EC ABI 107b to the foreign ABI 107c (i.e., when code in the EC native code 108b calls a function in the foreign binary 109). In some embodiments, each function in the EC native code 108b that can be called by foreign code comprises one entry thunk (which could be zero in size), and an exit thunk for each call to a different foreign function. In embodiments, thunks adapt to differences between the EC ABI 107b and the foreign ABI 107c, such as by adapting a CC of the EC ABI 107b to a CC of the foreign ABI 107c (or vice versa).

In embodiments, each entry thunk ensures that parameters being passed to an EC native function by a foreign function are in appropriate location(s) for consumption by the EC native function. This may include, for example, moving a value from one register to another, moving a value from a stack location to a register, moving a value from a register to a stack location, etc. In some embodiments, the EC ABI 107b may be defined in such a way that parameters passed to an EC native function by a foreign function are already in appropriate location(s) for consumption by the EC native function. In these situations, an entry thunk may be zero in size (and thus do nothing or be omitted). In some implementations, this may particularly be the case if the number of parameters being passed to the EC native function are below a threshold. For example, the inventors have observed that with an AArch64 native ISA and an x86_64 foreign ISA, it is possible to define the EC ABI 107b (including mappings between AArch64 and x86_64 registers) in a manner that makes it possible to have zero-sized entry thunks if fewer or equal than four parameters are passed from a foreign function to an EC native function, and all of these parameters are fundamental integers.

In embodiments, an exit thunk is utilized for each call by an EC native function to a foreign function, and thus a single EC native function may have zero or more exit thunks (depending on how many different foreign functions the EC native function calls). In embodiments, each exit thunk performs one or more of (i) saving a function return address to an appropriate location (e.g., stack or register) for returning to the EC native function, (ii) ensuring that parameters being passed from the EC native function to a called foreign function are in appropriate location(s) for consumption by the foreign function, or (iii) initiating execution of the foreign function within the emulator 106*b*.

Figure 4A:
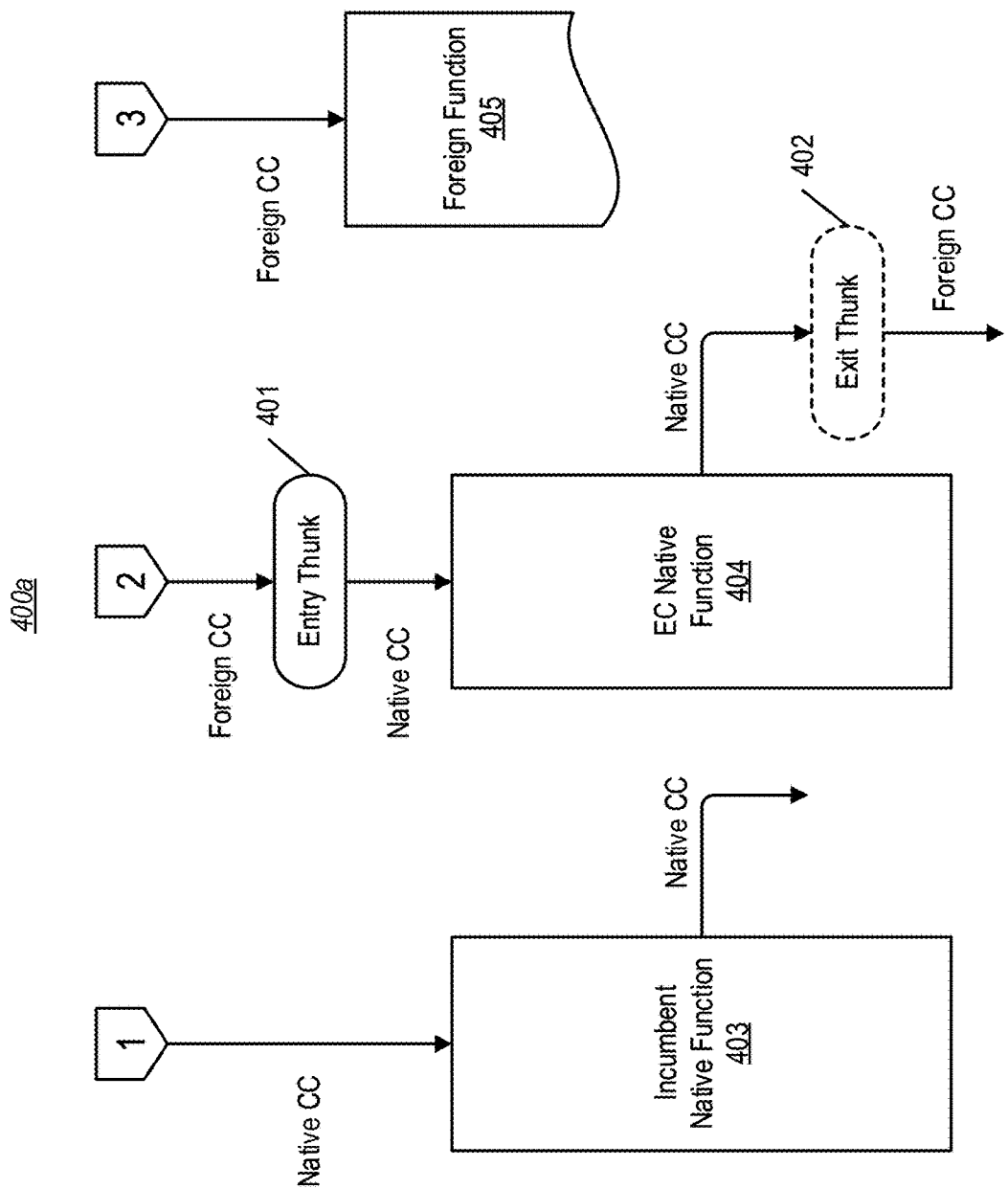
FIG. 4A illustrates calling behaviors for an "incumbent" native function compiled to target an incumbent ABI, as well as calling behaviors for an "EC" native function compiled to target an EC ABI.
Figure 4B:
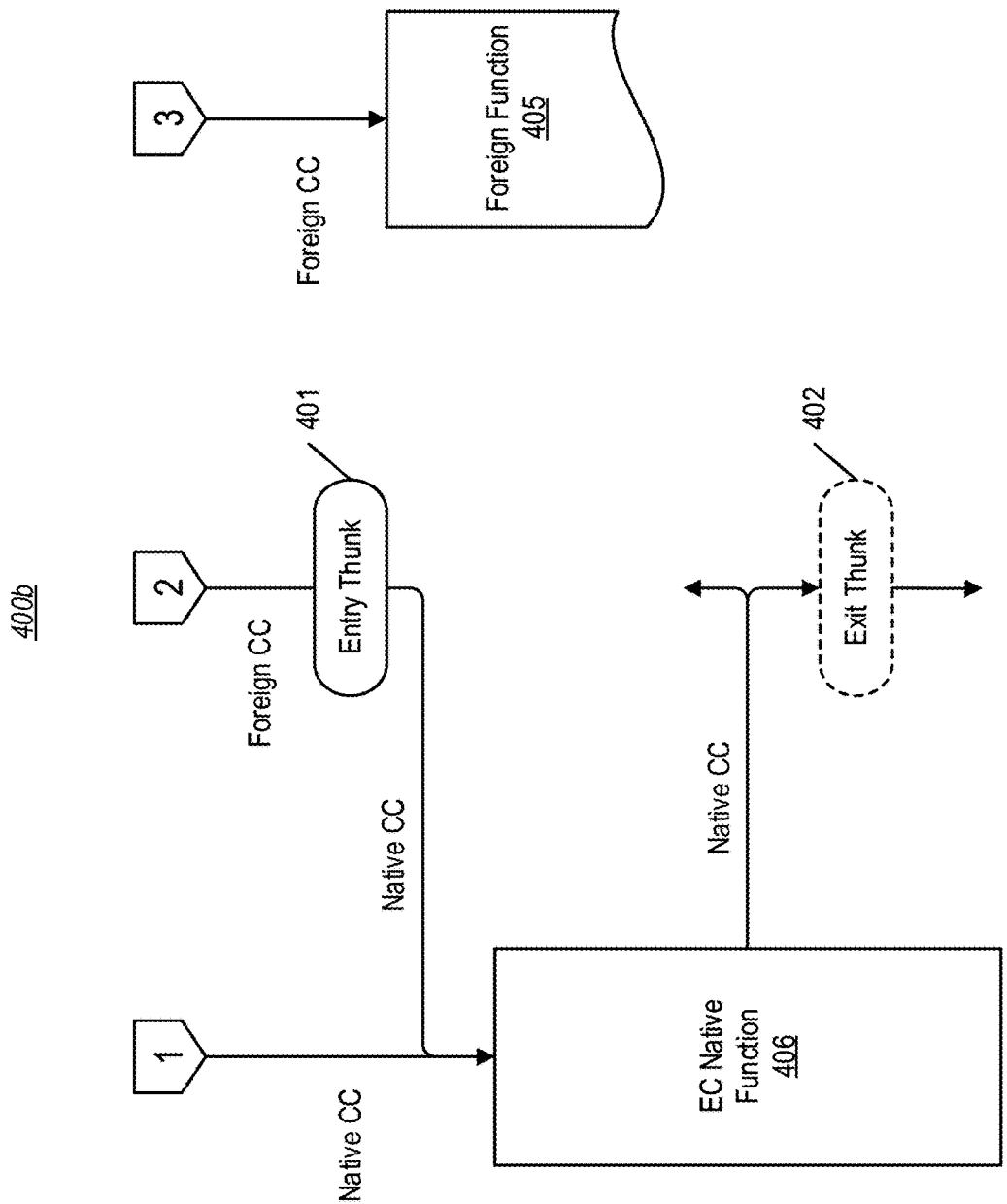
FIG. 4B illustrates calling behaviors for an "EC" native function which has been folded because identical code resulted from compiling a source code function to both an incumbent ABI and an EC ABI.

FIGS. 4A and 4B illustrate examples 400*a* and 400*b* of calls among native functions, and between native functions and foreign functions. In particular, FIG. 4A illustrates calling behaviors for an incumbent native function 403 compiled to target the incumbent ABI 107*a*, as well as calling behaviors for an EC native function 404 compiled to target the EC ABI 107*b*. In embodiments, the incumbent native function 403 and the EC native function 404 are different compiled versions of the same source code function, but have not been folded together due to mismatch between the resulting compiled code. In embodiments, this mismatch could arise because the incumbent native function 403 uses one or more registers available under the incumbent ABI 107*a* (but not under the EC ABI 107*b*), while the EC native function 403 uses only a reduced set of registers that map to the foreign ABI 107*c* (as discussed in connection with FIG. 3A). Alternatively, this mismatch could arise because a conditional code compilation forces a code logic divergence when targeting the incumbent ABI 107*a* and EC ABI 107*b*. For instance, as discussed, in embodiments the compiler toolchain 107*d* follows different preprocessor directives (and thus different logic paths) when compiling the same function to target each of the incumbent ABI 107*a* and EC ABI 107*b*. In particular, the compiler toolchain 107*d* takes a "native ISA" logic path when targeting the incumbent ABI 107*a*, but takes a "foreign ISA" logic path when targeting the EC ABI 107*b*.

In FIG. 4A, path #1 shows that the incumbent native function 403 is called using a native CC ("Native CC" in the Figures). Additionally, path #1 shows that the incumbent native function 403 can make calls using the Native CC. Path #2, on the other hand, shows that the EC native function 404 is indirectly called using a foreign CC (Foreign CC in the Figures) via an entry thunk 401, which adapts any differences between the Foreign CC and the Native CC, and then invokes the EC native function 404. Additionally, path #2 shows that the EC native function 404 may indirectly call a foreign function via an exit thunk 402 which adapts any differences between the Native CC and the Foreign CC, and then invokes the foreign function. Path #3 shows that foreign functions 405 (e.g., within code stream 301*c* and/or code stream 302) are called (e.g., by an exit thunk 402 or another foreign function) using the Foreign CC.

FIG. 4B illustrates calling behaviors for an EC native function 406 which has been folded because identical code resulted from compiling a source code function to both the incumbent ABI 107*a* and the EC ABI 107*b*. In FIG. 4B, path #1 shows that the EC native function 406 can be called using the Native CC, while path #2 shows that the EC native function 406 can also be indirectly called using the Foreign CC via an entry thunk 401. Additionally, FIG. 4B shows that the "EC native function 404 can make calls using the Native CC, either to other native functions or to foreign functions via an exit thunk 402. Path #3 shows that foreign functions 405 are called (e.g., by an exit thunk 402 or another foreign function) using the Foreign CC.

In embodiments, computer system 101 enable function call sites to consistently call/reference the true memory address of callee functions, even when bridging native and foreign code (i.e., between the ABI 107*b* and the foreign ABI 107*c*). Notably, using the true memory addresses at call sites is a challenge when bridging native and foreign code, due to the use of entry and exit thunks to bridge ABI transitions. This is in contrast to prior solutions that bridge native and foreign code, in which call sites within two native functions may actually use different addresses to call the same foreign function. This is because, in these prior solutions, call sites are actually calling the addresses of thunks, rather than the true address of the foreign functions. This behavior can introduce compatibly concerns if program logic in the native code relies on addresses comparisons (e.g., comparing a first pointer to a foreign function that was obtained by a first native function with a second pointer to the foreign function that was obtained by a second native function), if a pointer is passed from native code to foreign code (where it is invalid/unusable for the foreign code), or if a pointer is passed from foreign code to native code (where it is invalid/unusable for the native code). Using the solutions described herein, when obtaining (or "taking") a memory address of a first foreign function (e.g., within foreign binary 109), embodiments ensure that a first native function in the EC native code 108*b* and a second native function in the EC native code 108*b* both obtain the same memory address for the first foreign function—which is the true memory address at which the first foreign function begins. Additionally, embodiments also ensure that a second foreign function (e.g., within foreign binary 109) also obtains that same true memory address for the first foreign function. Embodiments also ensure that the address of a native function is the same regardless of whether that address is taken by a foreign function or by another native function.

In embodiments, consistent memory address references are enabled by an EC lookup structure 307 within the hybrid binary 108 (e.g., which is emitted into the hybrid binary 108 by the compiler toolchain 107*d*), together with a dispatcher 112 (i.e., dispatcher 112*a* in libraries 106*a* and dispatcher 112*b* in emulator 106*b*). In embodiments, the EC lookup structure 307 is any type of structure that is usable to determine which range(s) of memory addresses of a memory image defined by the hybrid binary 108 contain EC native code 108*b*. In embodiments, the EC lookup structure 307 is a bitmap, which uses one bit value to indicate whether or not a corresponding range of memory (e.g., a memory page) compromises EC native code 108*b*. However, the EC lookup structure 307 could comprise an alternate data structure type, such as a hash table or a binary tree.

In embodiments, when a call is being made from a caller function to a callee function, the dispatcher 112 uses the EC lookup structure 307 to determine whether a destination memory address for callee function is within EC native code. Then, with inherent knowledge of whether the caller function is native or foreign code, the dispatcher 112 dispatches the call as appropriate. In embodiments, the dispatcher 112 operates within at least four scenarios: a native caller and a native callee, a native caller and a foreign callee, a foreign caller and a foreign callee, and a foreign caller and a native callee.

In the first scenario, the caller function is a native function executing under the EC ABI 107*b*, and the call is thus handled by dispatcher 112*a* in libraries 106*a*. The dispatcher 112*a* uses the EC lookup structure 307 to determine that the callee's reference memory address is within a memory region corresponding to EC native code 108*b*, and that the callee function is therefore also a native function executing under the EC ABI 107*b*. In this situation, the caller is calling the true memory address of the callee function, and no thunk is needed, so the dispatcher 112a directly invokes the callee function using the reference memory address.

In the second scenario, the caller function is a native function executing under the EC ABI 107b, and the call is thus handled by dispatcher 112a in libraries 106a. The dispatcher 112a uses the EC lookup structure 307 to determine that the callee's reference memory address is not within a memory region corresponding to EC native code 108b, and that the callee function is therefore a foreign function executing under the foreign ABI 107c. Referring to FIG. 4A, this is the situation of path #2, in which the EC native function 404 calls a foreign function via exit thunk 402. As such, the dispatcher 112a cannot call the reference memory address (i.e., of the callee function) directly, because that would bypass the exit thunk 402. Instead, the dispatcher 112a locates a new reference address to the exit thunk 402, and invokes the exit thunk 402 using the new reference memory address. In embodiments, the exit thunk 402, in turn, adapts a CC of the EC ABI 107b to a CC of the foreign ABI 107c, and then invokes the emulator 106b. The emulator 106b, in turn, directly calls the callee function using the original reference memory address.

In embodiments, the new reference address to the exit thunk is contained within the callee function, itself. In these embodiments, a call site is associated with two reference memory addresses: the original reference memory address of the callee function, and the new reference address to the exit thunk. When the hybrid binary 108 is loaded under the incumbent ABI 107a, a dispatcher used by the incumbent ABI 107a uses the original reference memory address of the callee function directly, ignoring the new reference address to the exit thunk. Notably, the incumbent ABI 107a can ignore the new reference address to the exit thunk because it does not interact with foreign code. When the hybrid binary 108 is loaded under the EC ABI 107b, on the other hand, the dispatcher 112a also utilizes the new reference address to the exit thunk for interacting with foreign code. Notably, the compiler toolchain 107d facilitates foldability by including both the original reference memory address and the new reference address within compiled code, regardless of whether a function is being targeted to the incumbent ABI 107a or the EC ABI 107b.

In the third scenario, the caller function is a foreign function executing under the foreign ABI 107c within the emulator 106b, and the call is thus handled by dispatcher 112b in the emulator 106b. The dispatcher 112b uses the EC lookup structure 307 to determine that the callee's reference memory address is not within a memory region corresponding to EC native code 108b, and that the callee function is therefore also a foreign function executing under the foreign ABI 107c. In this situation, the caller is calling the true memory address of the callee function, and no thunk is needed, so the dispatcher 112b directly invokes the callee function using the reference memory address within the emulator 106b.

In the fourth scenario, the caller function is a foreign function executing under the foreign ABI 107c within the emulator 106b, and the call is thus handled by dispatcher 112b within the emulator 106b. The dispatcher 112b uses the EC lookup structure 307 to determine that the callee's reference memory address is within a memory region corresponding to EC native code 108b, and that the callee function is therefore a native function executing under the EC ABI 107b. Referring to FIG. 4A, this is the situation of path #2, in which a foreign function is calling the EC native function 404 via entry thunk 401. As such, the dispatcher 112b cannot call the reference memory address (i.e., of the callee function) directly, because that would bypass the entry thunk 401. Instead, the dispatcher 112b locates a new reference address to the entry thunk 401, and invokes the entry thunk 401 using the new reference memory address. In embodiments, the entry thunk 401, in turn, adapts a CC of the foreign ABI 107c to a CC of the EC ABI 107b, and then invokes the callee function using the original reference memory address.

Notably, in the fourth scenario, the caller function may be legacy foreign code that has not been designed with awareness of, or compatibility with, the EC ABI 107b. Thus— unlike the second scenario—the caller function cannot be modified (e.g., by a compiler toolchain) to contain the address of the entry thunk. In embodiments, the dispatcher 112b obtains the new reference address for the entry thunk from a block of memory immediately preceding the original reference memory address of the callee function. In embodiments, data for obtaining new reference address for the entry thunk was inserted into this block of memory by the compiler toolchain 107d during generation of the hybrid binary 108. The particular data contained in this block of memory can vary, but in some embodiments, it is a memory offset (e.g., from a beginning of a memory image defined by the hybrid binary 108). In other embodiments, it could be a direct address reference to the entry thunk. In other embodiments, the dispatcher 112b obtains the new reference address in some alternate way, such as from a data-tree or an ordered array of addresses.

In embodiments, the EC ABI 107b—together with the compiler toolchain 107d and the dispatcher 112—supports a "compatibility mode" that enables foreign code that calls native functions to successfully identify, and potentially patch, foreign code inserted at the beginning of the native functions. This enables foreign code to disassemble the beginning of a called function (e.g., as part of antivirus protection, copy protection, etc.) and/or to patch the beginning of a called function (e.g., as part of a profiling redirection) in connection with calling that function. Since foreign code—which may not have awareness that it is being emulated—may expect to find recognizable foreign code at the beginning of the called function, in some embodiments, the compiler toolchain 107d emits, into the hybrid binary 108, a "fast-forward sequence" (a form of a thunk) for a native function, on which the foreign code can operate for disassembly and/or patching. In embodiments, a "fast-forward sequence" comprises placeholder foreign code that concludes with a reference or jump to the true address of the native function. In embodiments, this fast-forward sequence is stored in a memory page marked in the EC lookup structure 307 as not comprising EC native code. Thus, in embodiments, when a foreign caller calls a native function having a fast-forward sequence, the call is initially treated as a foreign-to-foreign call (i.e., as in the third scenario above) such that the emulator 106b executes the fast-forward sequence and makes a foreign-to-native call at the conclusion of the fast-forward sequence (i.e., as in the fourth scenario above).

Notably, this arrangement could cause a double-thunking performance issue in which the emulator 106b is invoked just to emulate a few instructions in the fast-forward thunk (e.g., as in the third scenario), only to then initiate a call to another thunk—an entry thunk to the native function (e.g., as in the fourth scenario). Some embodiments avoid this double-thunking performance issue by configuring the dispatcher 112b (in the emulator 106b) to perform an additional check after determining that a callee's reference memory address is not within a memory region corresponding to EC native code 108b (i.e., using the EC lookup structure 307). This additional check is to "peek" at the beginning of the callee function to determine if a signature of the fast-forward sequence is present. If so, the dispatcher 112b obtains the true address of the native function from the fast-forward sequence and directly initiates a call to the native function (i.e., as in the fourth scenario above). By doing this additional check, processing of the fast-forward thunk by the emulator 106b has been avoided.

In view of the foregoing introduction, the following discussion now refers to a number of methods and method acts. Although the method acts may be discussed in a certain order or may be illustrated in a flow chart as occurring in a particular order, no particular ordering is required unless specifically stated, or required because an act is dependent on another act being completed prior to the act being performed.

Figure 5:
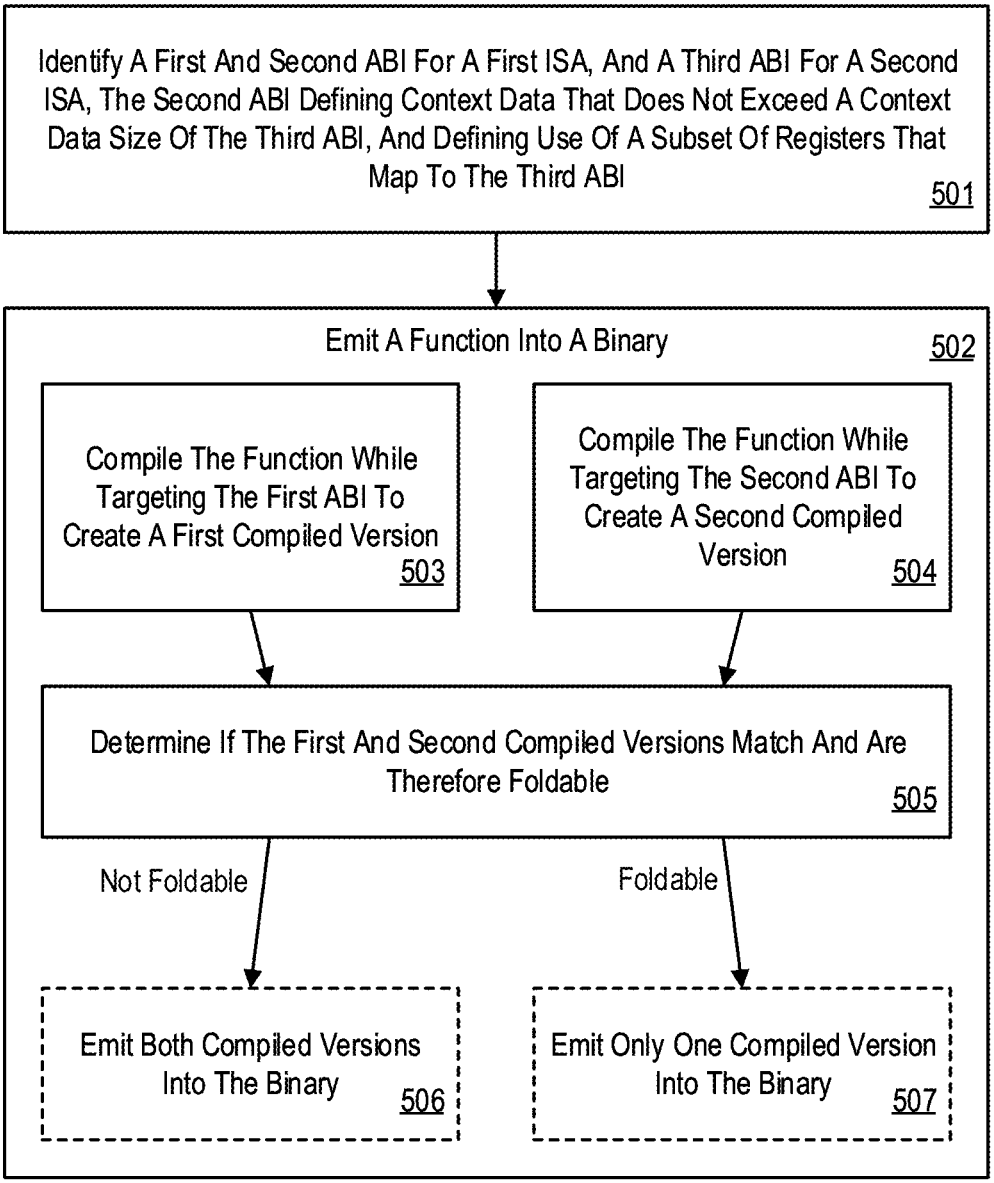
FIG. 5 illustrates a flow chart of an example method for compiling source code to a binary file targeting a native first instruction set architecture (ISA) while being operable with code compiled to a foreign second ISA.

Native Emulation Compatible Application Binary Interface for Supporting Emulation of Foreign Code FIG. 5 illustrates a flow chart of an example method 500 for compiling source code to a binary file targeting a native first ISA while being operable with code compiled to a foreign second ISA. Initially, method 500 comprises an act 501 of identifying a first and second ABI for a first ISA, and a third ABI for a second ISA, the second ABI defining context data that does not exceed a context data size of the third ABI, and defining use of a subset of registers that map to the third ABI. In embodiments, act 501 comprises identifying (i) a first ABI corresponding to the first ISA, (ii) a second ABI corresponding to the first ISA, and (iii) a third ABI corresponding to the second ISA. In an example, the compiler toolchain 107d identifies each of the incumbent ABI 107a (i.e., first ABI), the EC ABI 107b (i.e., second ABI), and the foreign ABI (i.e., third ABI).

In these embodiments, the second ABI defines a first context data format that has a first size that does not exceed second size of a second context data format used by the third ABI. In reference to FIG. 3A, for example, a format of context data 202b is defined by the EC ABI 107b to have a size that does not exceed a size of context data 202c (which is defined by the foreign ABI 107c).

In these embodiments, the second ABI also defines use of a subset of registers from among a plurality of registers of the first ISA, and that are used by the first ABI. In some embodiments, the subset of registers comprises less than all of the plurality of registers of the first ISA (e.g., as in example 200), though in other embodiments subset of registers comprises all of the plurality of registers of the first ISA. In embodiments, this subset of registers is mapped to a set of registers of the second ISA that are used by the third ABI. In embodiments, the second ABI only permits use of the subset of registers, to the exclusion of one or more other registers permitted by the first ABI. Referring again to FIG. 3A, the EC ABI 107b defines a set of available registers 201b, which are a subset of the available registers 201a used by the incumbent ABI 107a (i.e., and which omit one or more of available registers 201a used by the incumbent ABI 107a). In addition, the available registers 201b are mapped by the EC ABI 107b to the set of available registers 201c used by the foreign ABI 107c.

In embodiments, use of the subset of registers by the second ABI results in at least a portion of functions being foldable when compiled using each of the first ABI and the second ABI. For example, in embodiments the selection of available registers 201b mirrors available registers 201a closely enough that, in at least some cases, functions compiled against each of the incumbent ABI 107a and the EC ABI 107b result in identical compiled code. In embodiments, use of the subset of registers by the second ABI also enables at least a portion of functions compiled to target the second ABI to be called from the third ABI without an entry thunk. For example, if the first ABI is the AArch64 ABI, and the third ABI is the Windows-X64 ABI, it may be possible to define the second ABI in a manner that can omit entry thunks for native functions that receive four or fewer input parameters.

Method 500 also comprises an act 502 of emitting a function into a binary. As shown, act 502 includes an act 503 of compiling the function while targeting the first ABI to create a first compiled version, and an act 504 of compiling the function while targeting the second ABI to create a second compiled version. As shown, no particular ordering is shown between acts 503 and 504, and it will be appreciated that these acts could be performed in parallel or serially (in either order). In embodiments, for a function defined in the source code, act 503 comprises generating a second compiled version of the function that targets the second ABI, including generating a second set of instructions in the first ISA, while act 504 comprises generating a first compiled version of the function that targets the first ABI, including generating a first set of instructions in the first ISA. In an example, the compiler toolchain 107d compiles a source code function twice—once while targeting the first ABI, and once while targeting the second ABI—resulting in two compiled versions of the function. As discussed, in embodiments the compiler toolchain 107d takes a "native ISA" logic path when targeting the incumbent ABI 107a, and takes a "foreign ISA" logic path when targeting the EC ABI 107b. Thus, in some embodiments, generating the first compiled version of the function that targets the first ABI in act 502 comprises using source code definitions of the first ISA, and generating the second compiled version of the function that targets the second ABI in act 503 comprises using source code definitions of the second ISA.

Act 502 also comprises an act 505 of determining if the first and second compiled versions match and are therefore foldable. In embodiments, act 505 comprises determining whether the first compiled version of the function and the second compiled version of the function are foldable within the binary file, based at least on determining whether the first set of instructions and the second set of instructions match. In an example, the compiler toolchain 107d performs a comparison between the two compiled versions of the function produced in act 503 and act 504. If they match, then the two compiled versions of the function are foldable; otherwise, they are not foldable.

Depending on the outcome of act 505, act 502 comprises either an act 506 (when the compiled functions are not foldable) of emitting both compiled version into the binary, or an act 507 (when the compiled functions are foldable) of emitting only one compiled version into the binary. In embodiments, act 506 comprises, based at least on determining whether the first compiled version of the function and the second compiled version of the function are foldable within the binary file, and when the first compiled version of the function and the second compiled version of the function are determined to not be foldable within the binary file, emitting both the first compiled version of the function and the second compiled version of the function into the binary file. In an example, the compiler toolchain 107d emits both an incumbent version of the function (e.g., such as incumbent native function 403) and an EC version of the function (e.g., such as EC native function 404) into hybrid binary 108 when the compiled functions are not foldable. In embodiments, act 507 comprises, based at least on determining whether the first compiled version of the function and the second compiled version of the function are foldable within the binary file, and when the first compiled version of the function and the second compiled version of the function are determined to be foldable within the binary file, emitting only one of the first compiled version of the function or the second compiled version of the function into the binary file. In an example, the compiler toolchain 107d emits a single EC version of the function (e.g., such as EC native function 406) into hybrid binary 108 when the compiled functions are foldable.

In embodiments, the second ABI enables the binary file to be natively executed on both of (i) a first computer system implementing the first ABI but not the second ABI, and (ii) a second computer system implementing the second ABI. For example, a hybrid binary 108 generated using method 500 is executable on a "legacy" computer system implementing only the incumbent ABI 107a, or on a modern computer system also implementing the EC ABI 107b.

In some embodiments, method 500 also comprises emitting an entry thunk into the binary file, the entry thunk comprising code in the first ISA that adapts the third ABI to the second ABI. In an example, when act 506 is performed, the compiler toolchain 107d emits an entry thunk for the emitted EC version of the function (e.g., EC native function 404), enabling foreign code to call the function. In another example, when act 507 is performed, the compiler toolchain 107d emits an entry thunk for the single emitted function, which can be considered EC function (e.g., EC native function 406), enabling foreign code to call the function.

In some embodiments, method 500 also comprises emitting one or more exit thunks into the binary file, each exit thunk comprising code in the first ISA that adapts the second ABI to the third ABI. In an example, when act 506 is performed, the compiler toolchain 107d emits one or more exit thunks for the emitted EC version of the function (e.g., EC native function 404), enabling the function to call foreign code. In another example, when act 507 is performed, the compiler toolchain 107d emits one or more exit thunks for the single emitted function, enabling the function to call foreign code. In some embodiments, method 500 generates a different exit thunk for each different call by the function, but in other embodiments method 500 could generate a single exit thunk for each callee.

As mentioned, a hybrid binary may comprise additional foreign code streams, such as code stream 301c comprising foreign code. Thus, method 500 could further comprise generating a third compiled version of the function that targets the third ABI, including generating a third set of instructions in the second ISA, and emitting the third compiled version of the function into the binary file.

Some variations of method 500 may omit the "incumbent" code stream, such that the emitted binary targets the EC ABI 107b, but not the incumbent ABI 107a. As will be appreciated, the resulting binary provides compatibility with code targeting the foreign ABI 107c, but would lack backwards compatibility with programs implementing the incumbent ABI 107a but not the EC ABI 107b. In embodiments, omitting the "incumbent" code stream may be useful for binaries that are only intended to be used in an application that does not use the incumbent ABI 107a. As one example, a binary implementing functionality (e.g., codec support for an obsolete video format) that has been deprecated for use with native applications, but which is retained for compatibility with emulated applications.

Hybrid Binaries Supporting Code Stream Folding

Figure 6:
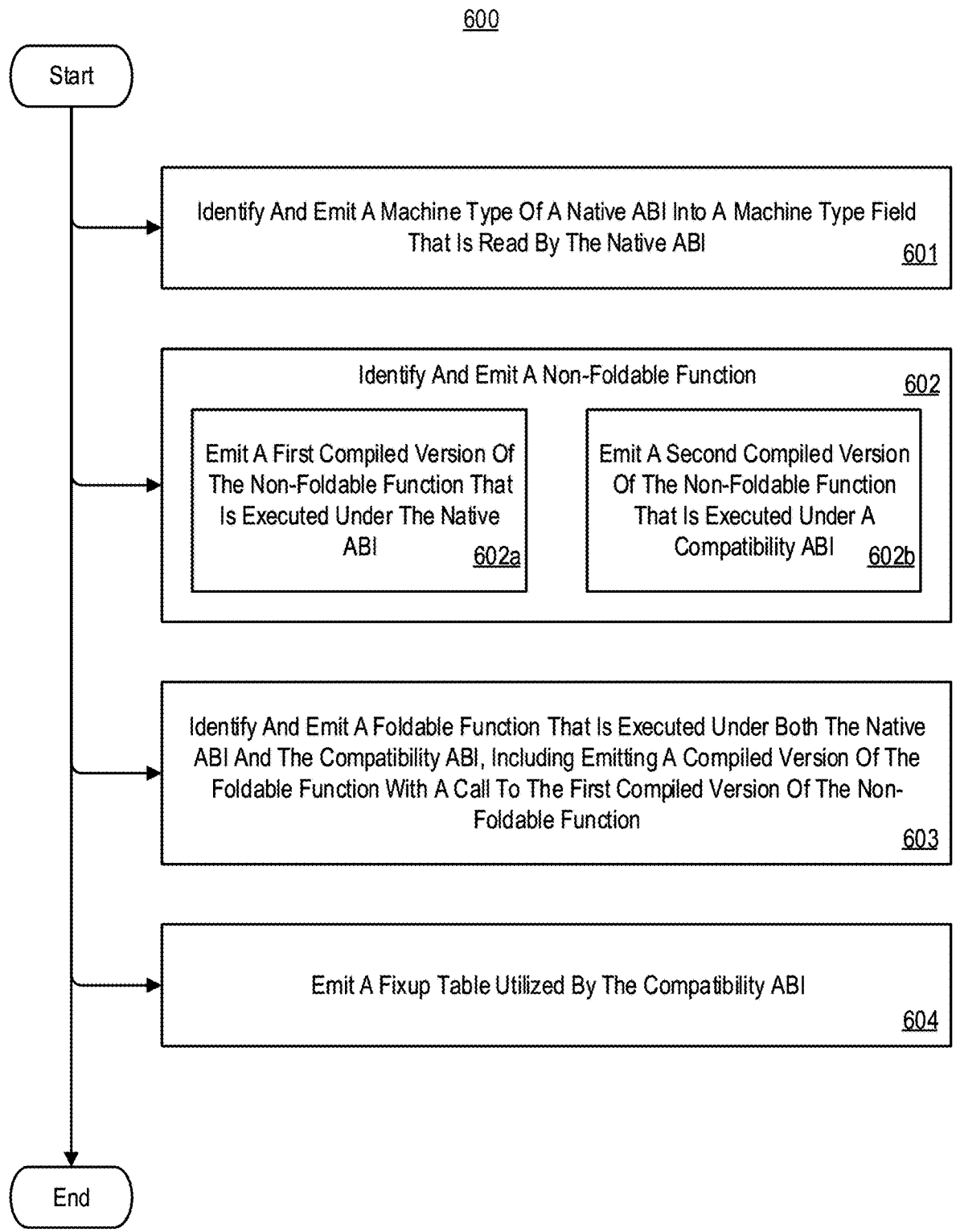
FIG. 6 illustrates a flow chart of an example method for generating a hybrid binary image that is executable under both a native ABI and a compatibility ABI.
Figure 7:
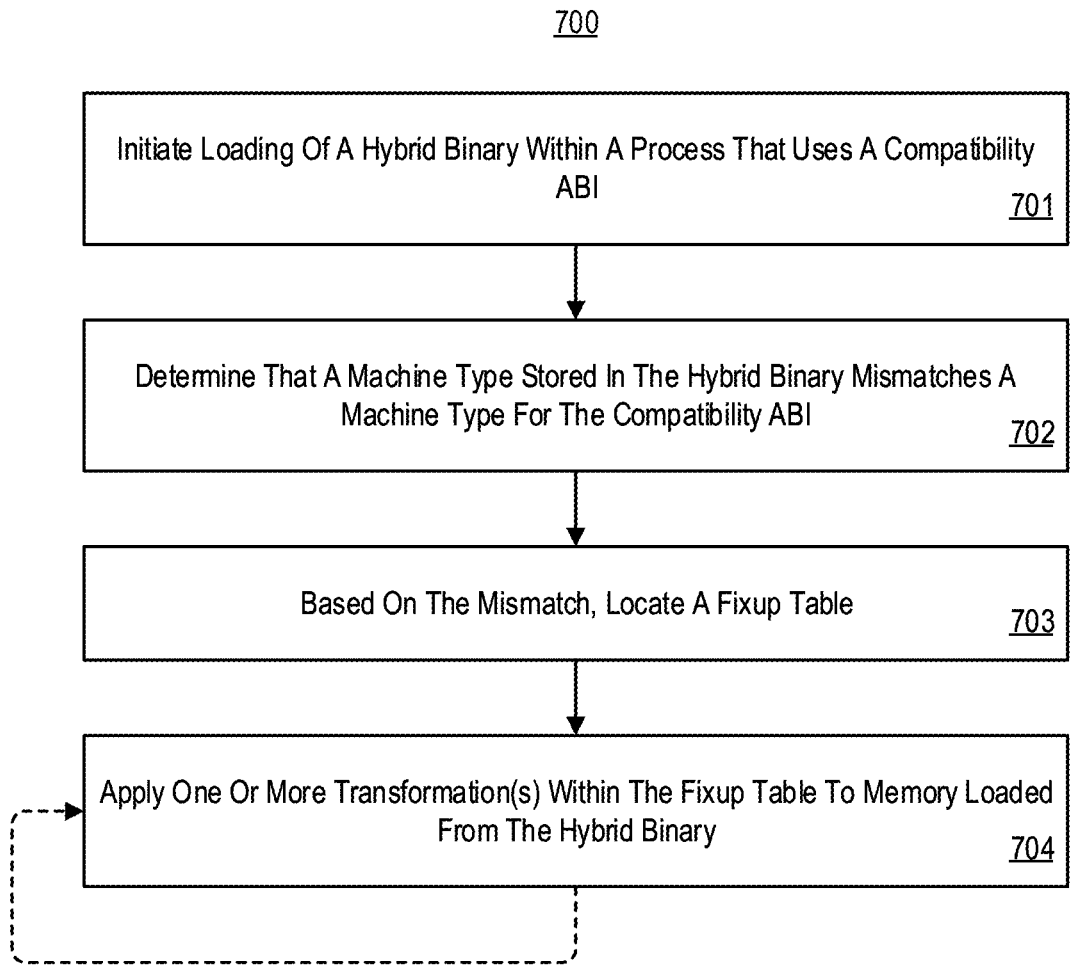
FIG. 7 illustrates a flow chart of an example method for consuming a hybrid binary image by a process executing under a compatibility ABI, the hybrid binary image being executable under both a native ABI and the compatibility ABI.

While FIG. 5 focused on a method for generating code using an EC ABI 107b that enables code folding, a hybrid binary 108 may comprise additional features that enable backward compatibility with legacy systems (e.g., having only the incumbent ABI 107a), while enabling modern system (e.g., having the EC ABI 107b) to take advantage of additional features for interacting with foreign code. To further describe creation of these dual-architecture hybrid binaries 108, FIG. 6 illustrates a flow chart of an example method 600 for generating a hybrid binary image, the hybrid binary image being executable under both a native ABI and a compatibility ABI. Then, to further describe consumption of these dual-architecture hybrid binaries 108, FIG. 7 illustrates a flow chart of an example method 700 for consuming a hybrid binary image by a process executing under a compatibility ABI, the hybrid binary image being executable under both a native ABI and the compatibility ABI.

Referring first to binary image creation, and to FIG. 6, Method 600 comprises a plurality of acts (i.e., acts 601-604) that, as indicated in the flow chart, can be performed in any order with respect to each other. As shown, method 600 comprises an act 601 of identifying and emitting a machine type of a native ABI into a machine type field that is read by the native ABI. In some embodiments, act 601 comprises, based at least on identifying a first machine type corresponding to the native ABI, emitting the first machine type into a machine type field of the hybrid binary image, the machine type field being structured to be utilized when the hybrid binary image is loaded by a native process executing under the native ABI. In an example, the compiler toolchain 107d emits, into hybrid binary 108, a machine identifier 303 that matches an identifier expected by the incumbent ABI 107a when loading binaries targeting the incumbent ABI 107a. By emitting an identifier expected by the incumbent ABI 107a, the incumbent ABI 107a sees what is expected when it loads the hybrid binary 108, even if the hybrid binary 108 is also compatible with the EC ABI 107b.

Method 600 also comprises an act 602 of identifying and emitting a non-foldable function. As shown, act 602 comprises both of (i) an act 602a of emitting a first compiled version of the non-foldable function that is executed under the native ABI, and (ii) an act 602b of emitting a second compiled version of the non-foldable function that is executed under a compatibility ABI. As shown, no particular ordering is shown between acts 602a and 602b, and it will be appreciated that these acts could be performed in parallel or serially (in either order). In some embodiments, act 602a comprises, based at least on identifying a non-foldable first function, emitting, into the hybrid binary image, a first compiled version of the first function that is executable under the native ABI, while act 602b comprises, based at least on identifying a non-foldable first function, emitting, into the hybrid binary image, a second compiled version of the first function that is executable under the compatibility ABI. In an example, based at least on compiling a source code function to different compiled versions (e.g., in act 503 and 504 of method 500), and also based on determining that those compiled versions are not foldable (e.g., in act 505 of method 500), the compiler toolchain 107d emits both of those compiled versions into hybrid binary 108 in act 602a and act 602b (e.g., as part of act 506 of method 500).

Method 600 also comprises an act 603 of identifying and emitting a foldable function that is executed under both the native ABI and the compatibility ABI, including emitting a compiled version of the foldable function with a call to the first compiled version of the non-foldable function. In some embodiments, act 603 comprises, based at least on identifying a foldable second function, emitting into the hybrid binary image a compiled version of the second function that is executable under both of the native ABI and the compatibility ABI. In an example, based at least on compiling a source code function to different compiled versions (e.g., in act 503 and 504 of method 500), and also based on determining that those compiled versions are foldable (e.g., in act 505 of method 500), the compiler toolchain 107*d* emits only one of those compiled versions into hybrid binary 108 in act 603 (e.g., as part of act 507 of method 500).

In embodiments, the compiled version of the second function is structured to call the first compiled version of the first function when the hybrid binary image is loaded by the native process. In an example, the compiler toolchain 107*d* configures the hybrid binary 108 such that the code emitted in act 603 calls the code emitted in act 602*a* "by default," so that the code emitted in act 602*a* (rather than the code emitted in act 602*b*) is executed when the hybrid binary 108 is loaded under the incumbent ABI 107*a*.

Method 600 also comprises an act 604 of emitting a fixup table utilized by the compatibility ABI. In some embodiments, act 604 comprises emitting, into the hybrid binary image, a fixup table that is structured to be utilized when the hybrid binary image is loaded by a compatibility process (e.g., emulated process 111) executing under the compatibility ABI, the fixup table defining a plurality of transformations to memory loaded from the hybrid binary image. In an example, the compiler toolchain 107*d* emits, into hybrid binary 108, a fixup table 108*c* that includes transformations, applied when the hybrid binary 108 is loaded under the EC ABI 107*b*, that cause EC features of the hybrid binary 108 to be utilized.

In embodiments, the plurality of transformations in the fixup table 108*c* include a transformation that adjusts the machine type field to comprise a second machine type corresponding to the compatibility ABI. In an example, the compiler toolchain 107*d* emits, into the fixup table 108*c*, a memory transformation that replaces (in system memory 104) a machine identifier loaded from the machine identifier 303 into system memory 104 with a machine identifier matching a foreign ISA corresponding to the foreign ABI 107*c*.

In embodiments, the plurality of transformations in the fixup table 108*c* include a transformation that configures the compiled version of the (foldable) second function to call the second compiled version of the (non-foldable) first function instead of the first compiled version of the (non-foldable) first function. In an example, the compiler toolchain 107*d* emits, into the fixup table 108*c*, a memory transformation that replaces a first memory address referencing the first compiled version of the (non-foldable) first function with a second memory address referencing the second compiled version of the (non-foldable) first function. While the first memory address could be replaced by the second memory address directly within the compiled version of the (foldable) second function directly, in embodiments, the compiled version of the (foldable) second function is structured to call the first compiled version of the (non-foldable) first function via a dispatch table 306 that references the first compiled version of the (non-foldable) first function. In these embodiments—rather than modifying the compiled version of the (foldable) second function, itself—this transformation modifies the dispatch table 306 to reference the second compiled version of the (non-foldable) first function instead of the first compiled version of the (non-foldable) first function. Further, in these embodiments, method 600 also comprises emitting the dispatch table into the hybrid binary image.

In embodiments, method 600 also comprises emitting, into the hybrid binary image, an entry point 304 referencing the first compiled version of the (foldable) first function. In embodiments, this entry point 304 is structured to be utilized when the hybrid binary image is loaded by the native process (e.g., using the incumbent ABI 107*a*). In embodiments, the plurality of transformations in the fixup table 108*c* include a transformation that adjusts the entry point to reference the second compiled version of the (foldable) first function instead. This adjusted entry point is thus utilized when the hybrid binary image is loaded by the compatibility process (e.g., using the EC ABI 107*b*).

As discussed in connection with FIGS. 3A and 3B, a hybrid binary 108 may comprise one or more of an import table or an export table (import/export table 305), with the hybrid binary 108 configured to show a "native" view exposing functions (and their locations) that are relevant to the incumbent ABI 107*a*. For example, as demonstrated in FIG. 3B, the import/export table 305 could be referred to using a base reference size/count that exposes native view 307*a*. Thus, in embodiments, method 600 comprises emitting, into the hybrid binary image, one or more tables that comprise (i) a first zone referencing at least the (non-folded) first function using the first compiled version of the (non-folded) first function, (ii) a second zone referencing at least the (folded) second function using the compiled version of the second function, and (iii) a third zone referencing at least the (non-folded) first function using the second compiled version of the (non-folded) first function.

In embodiments, in order to provide a "native" view of these table(s), method 600 comprises emitting, into the hybrid binary image, a reference to the one or more tables that provides a native view of the one or more tables that includes the first zone and the second zone, while excluding the third zone. This reference is structured to be utilized when the hybrid binary image is loaded by the native process (e.g., corresponding to incumbent ABI 107*a*). In these embodiments, the plurality of transformations in the fixup table 108*c* then include a transformation that adjusts the reference to the one or more tables to provide a compatibility view of the one or more tables (for use by the EC ABI 107*b*) that includes the second zone and the third zone, while excluding the first zone. Thus, in embodiments, the reference to the one or more tables provides the native view of the one or more tables by specifying an offset and a size, and a transformation in the fixup table 108*c* adjusts the reference to provide the compatibility view of these table(s) by modifying one or more of the offset or the size.

In embodiments, the emitted table(s) comprise an import table; thus, in embodiments of method 600, the one or more tables comprise one or more import tables, and the first, second, and third entries comprise first, second, and third function imports. In additional or alternative embodiments, the emitted table(s) comprise an export table; thus, in embodiments of method 600, or the one or more tables comprise one or more export tables, and the first, second, and third entries comprise first, second, and third function exports.

Referring now to binary image consumption, and to FIG. 7, method 700 comprises an act 701 of initiating loading of a hybrid binary within a process that uses a compatibility ABI. In an example, the loader 106*c* initiates loading of hybrid binary 108, leveraging one of libraries 106*a* that implement the EC ABI 107*b*.

Method 700 also comprises an act 702 of determining that a machine type stored in the hybrid binary mismatches a machine type for the compatibility ABI. In some embodiments, act 702 comprises, during loading of the hybrid binary image, determining that a first machine type stored in a machine type field of the hybrid binary image mismatches a second machine type corresponding to the compatibility ABI under which the process is executing. In an example, as part of loading hybrid binary 108, the loader 106*c* copies a memory page containing the machine identifier 303 into system memory 104. Then, the loader 106*c* determines that a value of the machine identifier 303 mismatches a value expected for the EC ABI 107*b* (e.g., a foreign ISA corresponding to the foreign ABI 107*c*).

Method 700 also comprises an act 703 of, based on the mismatch, locating a fixup table. In some embodiments, act 703 comprises, based on determining that the first machine type mismatches the second machine type, locating, within the binary image, a fixup table defining a plurality of transformations to memory loaded from the hybrid binary image. In an example, the loader 106*c* identifies fixup table 108*c* within the hybrid binary 108, such as by referring to a predefined address or offset within the hybrid binary 108, or to a predefined address or offset within a portion of system memory 104 that is populated by memory page(s) loaded from the hybrid binary 108.

Method 700 also comprises an act 704 of applying one or more transformation(s) within the fixup table to memory loaded from the hybrid binary. In some embodiments, act 704 comprises applying at least a portion of the plurality of transformations to the memory loaded from the hybrid binary image. In an example, the loader 106*c* applies one or more transformations obtained from the fixup table 108*c* to one or more portion(s) of system memory 104 that are populated by memory page(s) loaded from the hybrid binary 108.

While the loader 106*c* could apply all transformations in the fixup table 108*c* at once, in embodiments the loader 106*c* applies them on a page-by-page basis as those pages are loaded from the hybrid binary 108 (e.g., as part of a page fault handling routine). As such, in FIG. 7, act 704 is shown with an arrow leading back to act 704, indicating that this act may be applied repeatedly as memory pages are progressively loaded from the hybrid binary 108. Thus, in embodiments, transformation(s) to the memory loaded from the hybrid binary image are applied to a memory page loaded from the hybrid binary image in connection with processing a memory page fault.

In embodiments, the plurality of transformations obtained from the fixup table 108*c* include a transformation that adjusts the machine type field to comprise a second machine type corresponding to the compatibility ABI. In an example, the loader 106*c* applies a transformation to a memory location corresponding to the machine identifier 303 within system memory 104, which adjusts the memory location to store a value matching a foreign ISA corresponding to the foreign ABI 107*c*.

In embodiments, the plurality of transformations obtained from the fixup table 108*c* include a transformation that modifies a call site calling a first compiled version of a non-folded function that is executable under the native ABI to instead call a second compiled version of the non-folded function that is executable under the compatibility ABI. In an example, the loader 106*c* applies a memory location corresponding to the call site to replace a first memory address referencing the first compiled version of the non-folded function with a second memory address referencing a second compiled version of the non-folded function. While the call site, itself, could be transformed, in embodiments, the call site is structured to call the first compiled version of the non-folded function via a dispatch table 306 that references the first compiled version of the non-folded function. In these embodiments—rather than modifying the call site, itself—this transformation modifies the dispatch table 306 to reference the second compiled version of the non-folded function instead of the first compiled version of the non-folded function.

In embodiments, the hybrid binary image includes an entry point referencing the first compiled version of the non-folded function. In the embodiments, the plurality of transformations obtained from the fixup table 108*c* (and applied in act 704) include a transformation that adjusts the entry point to reference the second compiled version of the non-folded function.

As discussed in connection with FIG. 6, in embodiments, method 600 emits one or more tables, such as corresponding to import and/or export tables, along with reference(s) to these table(s) that provide a native view. Thus, in the context of method 700, in some embodiments the hybrid binary image includes one or more tables that comprise (i) a first zone referencing at least the non-folded function using the first compiled version of the non-folded function, (ii) a second zone referencing at least a folded function, and (iii) a third zone referencing at least the non-folded function using the second compiled version of the non-folded function. In these embodiments the hybrid binary image also includes a reference to the one or more tables that provides a native view of the one or more tables that includes the first zone and the second zone, while excluding the third zone. In order to provide a compatibility view when the binary image is loaded under the EC ABI 107*b*, method 700 can comprise applying a transformation that adjusts the reference to the one or more tables to provide a compatibility view of the one or more tables that includes the second zone and the third zone, while excluding the first zone.

Dual Architecture Function Pointers Having Consistent Reference Addresses

FIG. 8 illustrates a flow chart of an example method 800 for using a common reference memory address when processing calls within a process that supports execution of both (i) native code targeting a native ABI that corresponds to the native ISA and that has a first CC, and (ii) foreign code targeting a foreign ABI that corresponds to a foreign ISA and that has a second CC.

As shown, method 800 comprises an act 801 of identifying a call to a callee function using a reference address. In one example, the dispatcher 112*a* identifies a call from a native function in EC native code 108*b* to a reference memory address. In another example, dispatcher 112*b* identifies a call from a foreign function in foreign binary 109 (and which is being emulated by emulator 106*b*) to a reference memory address.

Method 800 also comprises an act 802 of, using a lookup structure and the reference address, determining whether the callee function corresponds to a native ABI or to a foreign ABI. In embodiments, act 802 comprises, based at least on identifying a call that targets a reference memory address for a callee function, determining whether the callee function corresponds to the native ABI or to the foreign ABI. In embodiments, the callee function is determined to correspond to the native ABI based a lookup structure indicating that the reference memory address is contained within a first memory range storing native code, and the callee function is determined to correspond to the foreign ABI based at least on the lookup structure indicating that the reference memory address is contained within a second memory range not storing native code. In an example, the dispatcher 112 (which could be either dispatcher 112a when the caller is native, or dispatcher 112b when the caller is foreign) consults EC lookup structure 307 to determine whether the reference memory address for the callee function is within a memory region corresponding to EC native code 108b (in which case the callee is determined to correspond to the EC ABI 107b), or whether the reference memory address for the callee function is not within a memory region corresponding to EC native code 108b (in which case the callee is determined to correspond to foreign ABI 107c).

As noted, in embodiments the EC lookup structure 307 is a bitmap, which uses one bit value to indicate whether or not a corresponding range of memory (e.g., a memory page) compromises EC native code 108b. However, the EC lookup structure 307 could comprise an alternate data structure type, such as a hash table or a binary tree. Thus, in method 800, the lookup structure comprises at least one of a bitmap, a hash table, or a binary tree.

As discussed, there could be an alternate scenario in which the callee function is determined to correspond to the native ABI—that is, when the dispatcher 112b determines that the callee function contains a signature of a fast-forward sequence. Thus, in some embodiments of act 802, the callee function is determined to correspond to the native ABI based on one of (i) a lookup structure indicating that the reference memory address is contained within a first memory range storing native code, or (ii) a fast-forward sequence being identified at the reference memory address. Additionally, in some embodiments of act 802, when the lookup structure indicates that the reference memory address is contained within the second memory range not storing native code, act 802 comprises determining whether the fast-forward sequence is identifiable at the reference memory address. In these embodiments, the dispatcher 112b obtains a new reference memory address from the fast-forward sequence (i.e., the true address of the native function) and uses that new reference memory address for a native call. Thus, in embodiments, when the fast-forward sequence is identified at the reference memory address, method 800 comprises updating the reference memory address with a new reference memory address obtained from the fast-forward sequence.

Method 800 also comprises an act 803 of initiating execution of the callee function. In embodiments act 803 comprises, based at least on the determining, initiating execution of the callee function. As shown, act 803 comprise performing one of an act 803a of, when the caller is foreign and the callee is foreign, directly calling the reference address in an emulator; an act 803b of, when the caller is foreign and the callee is native, locating and calling an entry thunk; an act 803c of, when the caller is native and the callee is foreign, calling an exit thunk; or an act 803d of, when the caller is native and the callee is native, directly calling the reference address.

In embodiments, act 803a comprises, when a caller function corresponds to the foreign ABI, and when the callee function is determined to correspond to the foreign ABI, directly calling the callee function using the reference memory address within an emulator. In an example, based on a call from a foreign function, the dispatcher 112b determines that the callee is also a foreign function. Thus, the caller is calling the true memory address of the callee function, and no thunk is needed, so the dispatcher 112b directly invokes the callee function using the reference memory address within the emulator 106b.

In embodiments, act 803b comprises, when the caller function corresponds to the foreign ABI, and when the callee function is determined to correspond to the native ABI, calling an entry thunk that (i) adapts a second CC to the first CC and then (ii) directly calls the callee function using the reference memory address. In an example, based on a call from a foreign function, the dispatcher 112b determines that the callee is a native function. Thus, the dispatcher 112b cannot call the reference memory address (i.e., of the callee function) directly, because that would bypass an entry thunk. Instead, the dispatcher 112b locates a new reference address to the entry thunk and invokes the entry thunk using the new reference memory address. The entry thunk, in turn, adapts a CC of the foreign ABI 107c to a CC of the EC ABI 107b, and invokes the callee function using the original reference memory address.

As discussed, in embodiments, the dispatcher 112b locates the new reference address to the entry thunk based on data (such as an offset or a direct address reference) contained in a block of memory immediately preceding the original reference memory address of the callee function. Thus, in embodiments, method 800 also comprises identifying a location of the entry thunk based at least on (i) reading a block of memory immediately preceding the reference memory address, and (ii) determining from the block of memory an offset or a pointer to the location of entry thunk.

In embodiments, act 803c comprises, when the caller function corresponds to the native ABI, and when the callee function is determined to correspond to the foreign ABI, calling an exit thunk that (i) adapts a first CC of the native ABI to a second CC of the foreign ABI and then (ii) invokes the emulator to directly call the callee function using the reference memory address. In an example, based on a call from a native function, the dispatcher 112a determines that the callee is a foreign function. Thus, the dispatcher 112a cannot call the reference memory address (i.e., of the callee function) directly, because that would bypass an exit thunk. Instead, the dispatcher 112a locates a new reference address to the exit thunk and invokes the exit thunk using the new reference memory address. The exit thunk, in turn, adapts a CC of the EC ABI 107b to a CC of the foreign ABI 107c, and invokes the emulator 106b. The emulator 106b, in turn, directly calls the callee function using the original reference memory address. As discussed, in embodiments the new reference address to the exit thunk is contained within the callee function, itself. Thus, in some embodiments of method 800, a location of the exit thunk is contained within the caller function.

In embodiments, act 803d comprises, when the caller function corresponds to the native ABI, and when the callee function is determined to correspond to the native ABI, directly calling the callee function using the reference memory address. In an example, based on a call from a native function, the dispatcher 112a determines that the callee is also a native function. Thus, the caller is calling the true memory address of the callee function, and no thunk is needed, so the dispatcher 112a directly invokes the callee function using the reference memory address.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 101) that includes computer hardware, such as, for example, one or more processors (e.g., processor 102) and system memory (e.g., system memory 104), as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., durable storage 103, system memory 104). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. The terms "set" and "subset" are indented to exclude an empty set, and thus "set" and is defined as a non-empty set, and "subset" is defined as a non-empty subset.

What is claimed:

1. A method, implemented at a computer system that includes a processor implementing a native instruction set architecture (ISA), for using a common reference memory address when processing calls within a process that supports execution of both (i) native code targeting a native application binary interface (ABI) that corresponds to the native ISA and that has a first calling convention, and (ii) foreign code targeting a foreign ABI that corresponds to a foreign ISA and that has a second calling convention, the method comprising:
   based at least on identifying a call that targets a reference memory address for a callee function, determining whether the callee function corresponds to the native ABI or to the foreign ABI, wherein:
   the callee function is determined to correspond to the native ABI based on one of (i) a lookup structure indicating that the reference memory address is contained within a first memory range storing native code, or (ii) a fast-forward sequence being identified at the reference memory address, and
   the callee function is determined to correspond to the foreign ABI based at least on the lookup structure indicating that the reference memory address is contained within a second memory range not storing native code; and
   based at least on the determining, initiating execution of the callee function based on performing one of:
   when a caller function corresponds to the foreign ABI, and when the callee function is determined to correspond to the foreign ABI, directly calling the callee function using the reference memory address within an emulator;
   when the caller function corresponds to the foreign ABI, and when the callee function is determined to correspond to the native ABI, calling an entry thunk that (i) adapts a second calling convention to the first calling convention and then (ii) directly calls the callee function using the reference memory address;
   when the caller function corresponds to the native ABI, and when the callee function is determined to correspond to the foreign ABI, calling an exit thunk that (i) adapts a first calling convention of the native ABI to a second calling convention of the foreign ABI and then (ii) invokes the emulator to directly call the callee function using the reference memory address; or
   when the caller function corresponds to the native ABI, and when the callee function is determined to correspond to the native ABI, directly calling the callee function using the reference memory address.

2. The method of claim 1, wherein the caller function corresponds to the foreign ABI and the callee function is determined to correspond to the foreign ABI, and wherein initiating execution of the callee function comprises directly calling the callee function using the reference memory address within the emulator.

3. The method of claim 1, wherein the caller function corresponds to the foreign ABI and the callee function is determined to correspond to the native ABI, and wherein initiating execution of the callee function comprises calling the entry thunk.

4. The method of claim 3, further comprising identifying a location of the entry thunk based at least on (i) reading a block of memory immediately preceding the reference memory address, and (ii) determining from the block of memory an offset or a pointer to the location of entry thunk.

5. The method of claim 1, wherein the caller function corresponds to the native ABI and the callee function is determined to correspond to the foreign ABI, and wherein initiating execution of the callee function comprises calling the exit thunk.

6. The method of claim 5, wherein a location of the exit thunk is contained within the caller function.

7. The method of claim 1, wherein the caller function corresponds to the native ABI and the callee function is determined to correspond to the native ABI, and wherein initiating execution of the callee function comprises directly calling the callee function using the reference memory address.

8. The method of claim 1, further comprising, when the fast-forward sequence is identified at the reference memory address, updating the reference memory address with a new reference memory address obtained from the fast-forward sequence.

9. The method of claim 1, further comprising, when the lookup structure indicates that the reference memory address is contained within the second memory range not storing native code, determining whether the fast-forward sequence is identifiable at the reference memory address.

10. The method of claim 1, wherein the lookup structure comprises at least one of a bitmap, a hash table, or a binary tree.

11. A computer system for using a common reference memory address when processing calls within a process that supports execution of both (i) native code targeting a native application binary interface (ABI) that corresponds to a native instruction set architecture (ISA) and that has a first calling convention, and (ii) foreign code targeting a foreign ABI that corresponds to a foreign ISA and that has a second calling convention, comprising:
   a processor implementing the native ISA; and
   a hardware storage device that stores computer-executable instructions that are executable by the processor to cause the computer system to perform at least the following:
   based at least on identifying a call that targets a reference memory address for a callee function, determine whether the callee function corresponds to the native ABI or to the foreign ABI, wherein:
   the callee function is determined to correspond to the native ABI based on one of (i) a lookup structure indicating that the reference memory address is contained within a first memory range storing native code, or (ii) a fast-forward sequence being identified at the reference memory address, and
   the callee function is determined to correspond to the foreign ABI based at least on the lookup structure indicating that the reference memory address is contained within a second memory range not storing native code; and
   based at least on the determining, initiate execution of the callee function based on performing one of:

when a caller function corresponds to the foreign ABI, and when the callee function is determined to correspond to the foreign ABI, directly calling the callee function using the reference memory address within an emulator;

when the caller function corresponds to the foreign ABI, and when the callee function is determined to correspond to the native ABI, calling an entry thunk that (i) adapts a second calling convention to the first calling convention and then (ii) directly calls the callee function using the reference memory address;

when the caller function corresponds to the native ABI, and when the callee function is determined to correspond to the foreign ABI, calling an exit thunk that (i) adapts a first calling convention of the native ABI to a second calling convention of the foreign ABI and then (ii) invokes the emulator to directly call the callee function using the reference memory address; or when the caller function corresponds to the native ABI, and when the callee function is determined to correspond to the native ABI, directly calling the callee function using the reference memory address.

12. The computer system of claim 11, wherein the caller function corresponds to the foreign ABI and the callee function is determined to correspond to the foreign ABI, and wherein initiating execution of the callee function comprises directly calling the callee function using the reference memory address within the emulator.

13. The computer system of claim 11, wherein the caller function corresponds to the foreign ABI and the callee function is determined to correspond to the native ABI, and wherein initiating execution of the callee function comprises calling the entry thunk.

14. The computer system of claim 13, the computer-executable instructions also executable by the processor to cause the computer system to identify a location of the entry thunk based at least on (i) reading a block of memory immediately preceding the reference memory address, and (ii) determining from the block of memory an offset or a pointer to the location of entry thunk.

15. The computer system of claim 11, wherein the caller function corresponds to the native ABI and the callee function is determined to correspond to the foreign ABI, and wherein and initiating execution of the callee function comprises calling the exit thunk.

16. The computer system of claim 15, wherein a location of the exit thunk is contained within the caller function.

17. The computer system of claim 11, wherein the caller function corresponds to the native ABI and the callee function is determined to correspond to the native ABI, and wherein initiating execution of the callee function comprises directly calling the callee function using the reference memory address.

18. The computer system of claim 11, the computer-executable instructions also executable by the processor to cause the computer system to update the reference memory address with a new reference memory address obtained from the fast-forward sequence when the fast-forward sequence is identified at the reference memory address.

19. The computer system of claim 11, the computer-executable instructions also executable by the processor to cause the computer system to determine whether the fast-forward sequence is identifiable at the reference memory address when the lookup structure indicates that the reference memory address is contained within the second memory range not storing native code.

20. A computer program product for using a common reference memory address when processing calls within a process that supports execution of both (i) native code targeting a native application binary interface (ABI) that corresponds to a native instruction set architecture (ISA) and that has a first calling convention, and (ii) foreign code targeting a foreign ABI that corresponds to a foreign ISA and that has a second calling convention, the computer program product comprising a hardware storage device that stores computer-executable instructions that are executable by a processor implementing the native ISA to cause a computer system to perform at least the following:

based at least on identifying a call that targets a reference memory address for a callee function, determine whether the callee function corresponds to the native ABI or to the foreign ABI, wherein:

the callee function is determined to correspond to the native ABI based on one of (i) a lookup structure indicating that the reference memory address is contained within a first memory range storing native code, or (ii) a fast-forward sequence being identified at the reference memory address, and the callee function is determined to correspond to the foreign ABI based at least on the lookup structure indicating that the reference memory address is contained within a second memory range not storing native code; and based at least on the determining, initiate execution of the callee function based on performing one of:

when a caller function corresponds to the foreign ABI, and when the callee function is determined to correspond to the foreign ABI, directly calling the callee function using the reference memory address within an emulator;

when the caller function corresponds to the foreign ABI, and when the callee function is determined to correspond to the native ABI, calling an entry thunk that (i) adapts a second calling convention to the first calling convention and then (ii) directly calls the callee function using the reference memory address;

when the caller function corresponds to the native ABI, and when the callee function is determined to correspond to the foreign ABI, calling an exit thunk that (i) adapts a first calling convention of the native ABI to a second calling convention of the foreign ABI and then (ii) invokes the emulator to directly call the callee function using the reference memory address; or when the caller function corresponds to the native ABI, and when the callee function is determined to correspond to the native ABI, directly calling the callee function using the reference memory address.

* * * * *